(12) United States Patent
Mesde et al.

(10) Patent No.: US 12,124,430 B2
(45) Date of Patent: Oct. 22, 2024

(54) VEHICLE UPDATE SYSTEM

(71) Applicant: Amazon Technologies, Inc., Seattle, WA (US)

(72) Inventors: Roland Mesde, Cupertino, CA (US); Alex Bessonov, San Jose, CA (US); Nitin Giri, Bothell, WA (US); Kyle Daniel Halbach, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 24 days.

(21) Appl. No.: 17/710,634

(22) Filed: Mar. 31, 2022

(65) Prior Publication Data
US 2023/0315717 A1    Oct. 5, 2023

(51) Int. Cl.
| | |
|---|---|
| G06F 16/23 | (2019.01) |
| B60W 50/04 | (2006.01) |
| B60W 50/06 | (2006.01) |
| B60W 50/14 | (2020.01) |
| G06F 9/54 | (2006.01) |
| G06F 16/27 | (2019.01) |

(52) U.S. Cl.
CPC ....... G06F 16/2365 (2019.01); B60W 50/045 (2013.01); B60W 50/06 (2013.01); B60W 50/14 (2013.01); G06F 9/546 (2013.01); G06F 16/273 (2019.01); B60W 2556/45 (2020.02)

(58) Field of Classification Search
CPC .... G06F 16/2365; G06F 9/546; G06F 16/273; B60W 50/045; B60W 50/06; B60W 50/14; B60W 2556/45
See application file for complete search history.

(56) References Cited

U.S. PATENT DOCUMENTS

| | | | | |
|---|---|---|---|---|
| 10,332,320 | B2* | 6/2019 | Lakshamanan | G06N 20/10 |
| 11,441,916 | B1* | 9/2022 | Konrardy | G01C 21/3617 |
| 11,468,285 | B1* | 10/2022 | Tang | G06V 10/255 |
| 2013/0151135 | A1* | 6/2013 | Aubrey | G08G 1/0116 |
| | | | | 701/117 |

(Continued)

OTHER PUBLICATIONS

International Search Report and Written Opinion mailed Jun. 30, 2023 in PCT/US2023/015994, Amazon Technologies, Inc.

(Continued)

*Primary Examiner* — Angelica Ruiz
(74) *Attorney, Agent, or Firm* — Alexander A. Knapp; Kowert, Hood, Munyon, Rankin & Goetzel, P.C.

(57) ABSTRACT

Systems and methods are disclosed for implementing a vehicle shadow service that includes a vehicle and/or vehicle shadow update mechanism. A vehicle shadow management sub-system of the vehicle shadow service includes or interfaces with an interface configured to receive vehicle state change requests. Received requests are stored in an update queue for a vehicle shadow and a validation processor determines whether the received state change requests are valid before sending a given state change request to a vehicle corresponding to the vehicle shadow. In some embodiments, state change requests may be invalidated due to being rendered moot by subsequently received requests, changes in state of the vehicle, expiration, etc. The corresponding vehicle shadow is then updated when a data stream from the vehicle indicates that the requested state change has in fact been implemented at the vehicle.

20 Claims, 22 Drawing Sheets

(56) References Cited

U.S. PATENT DOCUMENTS

| | | | |
|---|---|---|---|
| 2019/0384870 A1 | 12/2019 | Shiraishi et al. | |
| 2021/0144517 A1 | 5/2021 | Guim Bernat | |
| 2021/0272394 A1 | 9/2021 | Cella | |
| 2022/0038872 A1* | 2/2022 | Lu | G08C 17/02 |
| 2022/0080977 A1* | 3/2022 | Ucar | B60W 40/09 |
| 2022/0250636 A1* | 8/2022 | Ucar | B60W 50/06 |
| 2022/0260989 A1* | 8/2022 | Lepird | B60W 50/0205 |
| 2022/0402519 A1* | 12/2022 | Schöning | G06F 30/15 |

OTHER PUBLICATIONS

Ghanishtha Bhatti, et al: "Towards the future of smart electric vehicles: Digital twin technology", Renewable and Sustainable Energy Reviews, vol. 141, Feb. 17, 2021, pp. 1-18.

U.S. Appl. No. 17/037,376, filed Sep. 29, 2020, Michael Garcia, et al.

U.S. Appl. No. 17/160,184, filed Jan. 27, 2021, Assimakis Tzamaloukas, et al.

Stefan Boschert, "Next Generation Digital Twin," Conference Paper May 2018, ResearchGate, in Proceedings of TMCE 2018, pp. 209-218.

U.S. Appl. No. 17/710,551, filed Mar. 31, 2022, Roland Mesde, et al.

U.S. Appl. No. 17/710,585, filed Mar. 31, 2022, Roland Mesde, et al.

U.S. Appl. No. 17/710,644, filed Mar. 31, 2022, Roland Mesde, et al.

\* cited by examiner

VEHICLE UPDATE SYSTEM

BACKGROUND

In recent years, increases in adoption of technologies such as distributed cloud computing as well as the digitization of various industries has led to data becoming a crucial component of the modern global economy. For vehicles, a remote data storage system, such as a cloud-based computing system, may store vehicle data. Such systems typically receive snapshots of vehicle data generated at a vehicle and submitted to the remote data storage system via a network. However, such systems may be inflexible and/or inefficient to operate. For example, some users may be interested in only a subset of vehicle data as opposed to a full listing of vehicle data included in a snapshot. Also, such systems may lack a process to update a vehicle state and/or require data updates for different elements of a vehicle shadow to be updated at a same rate based on snapshot frequency, even though the underlying vehicle data may have varying data update frequencies.

BRIEF DESCRIPTION OF THE DRAWINGS

FIG. 4 also illustrates a vehicle shadow management sub-system that enables state changes to be queued, sent to a vehicle, reflected in an updated vehicle shadow, and/or invalidated, if necessary, along with other components, according to some embodiments.

Figure 1:
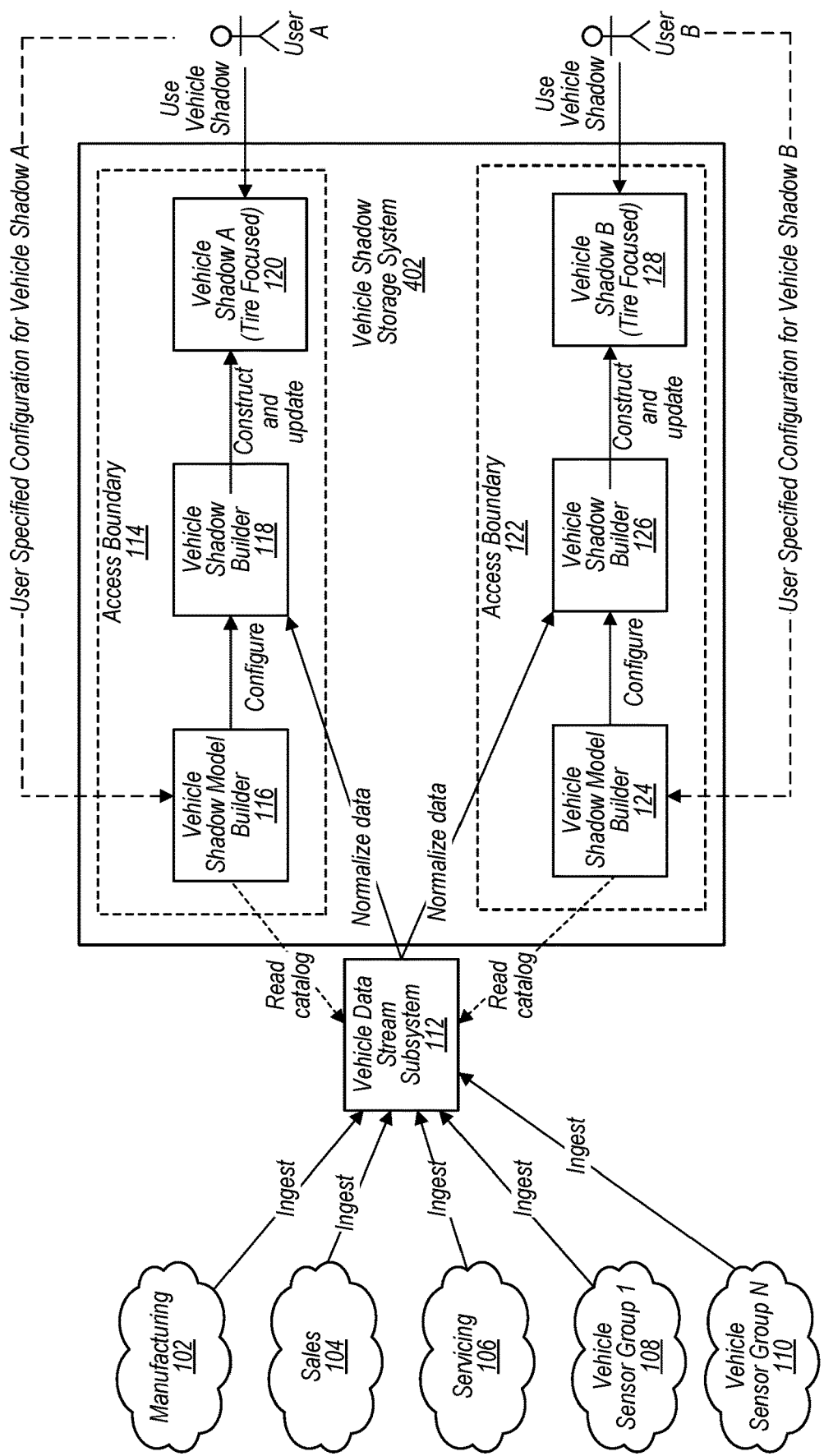
FIG. 1 illustrates a vehicle shadow storage system, which may be a sub-system of a vehicle shadow service. The vehicle shadow storage system is configured to maintain a plurality of vehicle shadows representing different perspectives of a same vehicle, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a vehicle shadow service. In some embodiments, the vehicle shadow service is configured to asynchronously receive disaggregated sensor data in one or more data streams from a vehicle and/or other data sources related to the vehicle, such as a service department, etc. The asynchronous streaming data may include data that is generated at different rates. For example, engine information may be generated at a higher rate (e.g., more frequently) than tire pressure data. By disaggregating and asynchronously receiving and processing the data from the various data sources related to the vehicle, the vehicle shadow service may provide a vehicle shadow that is kept up-to-date and which requires less network overhead than other approaches. For example, in designs where a snapshot of the vehicle is generated at the vehicle and sent to a remote service to be presented as a representation of a vehicle state, the snapshot may not be generated at a high enough frequency to capture vehicle data that is updated at a high rate, or if generated at a high enough frequency, the snapshots may require signaling of redundant data and thus inefficiently use system and network resources. For example, if tire pressure is updated once a minute and engine data is updated at a rate of once per second, then a snapshot would need to be generated at a rate of 1 snapshot per second (in order to match the engine data frequency) but would include the same measured tire pressure redundantly transmitted in 60 snapshots. Conversely, if snapshots were sent at a rate of once per minute, the engine data would have significantly less fidelity by averaging 60 measurements into a single signaled data point. However, a vehicle shadow service that allows for receiving and processing of asynchronous disaggregated data, enables the engine data to be processed at a first rate, for example of once per second (without redundantly signaling lower frequency data), and the tire pressure data to be processed at a second rate, for example once per minute.

Also, in some embodiments, a vehicle shadow may be constructed using partial data signals from heterogenous sources. For example, some vehicle data may be provided to the vehicle shadow from the vehicle itself e.g., via a sub-set of sensors of the vehicle, and other vehicle information about the vehicle may be provided from other sources, such as other vehicles that observe the vehicle, a service department where the vehicle is serviced, etc. In some embodiments, a vehicle shadow service may validate the data from the heterogenous sources (where the heterogenous sources may comprise heterogenous sources located on the vehicle and/or additional heterogenous sources external to the vehicle) prior to applying the vehicle data to a vehicle shadow for the vehicle. For example, the vehicle shadow service may verify that the received data is properly linked to the vehicle, for example by verifying a vehicle identification number (VIN) included with the received vehicle data. Also, in some embodiments, the vehicle shadow is partially constructed (and/or partially updated) as new vehicle data fragments are received at the vehicle shadow service. For example, this can be contrasted with buffering vehicle data and waiting to construct or update the vehicle shadow until all (or substantially all) the vehicle data has been stored to the buffer for a given update interval. For example, the vehicle shadow may be partially updated with new engine data without requiring the tire pressure data of the vehicle shadow to be updated.

In some embodiments a data stream from the vehicle is registered to be provided to a given vehicle shadow. The data stream may be parsed into data elements corresponding to sensors of the vehicle, and each data stream for a given sensor may be mapped to one or more attributes of a schema. In some embodiments, the schema may be an intermediate representation that enables mapping data streams to nodes of a vehicle shadow. Also, the scheme may represent a chunk of streaming data that is being processed. For example, the attributes of the schema to which elements of streaming data corresponding to given sensors of the vehicle are mapped may further be mapped to one or more nodes of the vehicle shadow. This may allow for mapping data from multiple sensors to a single node of the vehicle shadow and/or applying one or more transformations to a single element of data corresponding to a single sensor and/or applying a transformation that takes multiple elements of data from multiple sensors as inputs to generate an output included in a node of the vehicle shadow.

In some embodiments, a vehicle shadow mapping may allow for cardinalities of two or more. For example, tire pressure may be mapped to a front right tire using two different paths to a destination node of the vehicle shadow (e.g., cardinality greater than one). For example, a tire pressure for a front right tire may be mapped using a first path such as front, then right, or a second path such as right, then front.

Also, in some embodiments, a structure of a vehicle shadow may be constructed using various model types. For example, in some embodiments, a tree-structure may be used wherein the vehicle components are organized based on a tree and leaves of the tree comprise nodes that are updated with streaming data. In other embodiments, a graph-structure may be used wherein streaming data is used to update nodes of the graph and edges between the nodes of the graph represent relationships between the nodes as represented in the actual vehicle. For example, an edge between a wheel and an axle may represent that the wheel is connected to the axle in the actual vehicle.

In some embodiments, a vehicle shadow service may provide a user interface that enables users of the vehicle shadow service to define custom "perspective-based vehicle shadows." For example, users of a vehicle shadow service may include engineers working at a vehicle manufacturer. A first team of engineers charged with designing the engine may be concerned with engine information, but not be as interested in tire information. Also, a second team of engineers charged with designing the tires may be concerned with tire information, but not be as interested in engine information. In some embodiments, the first and second team of engineers may be "users" of the vehicle shadow service. The first team of engineers may select a configuration for a first vehicle shadow that is from the perspective of the engine. The first vehicle shadow may include nodes that represent engine information, but may omit other types of information about the vehicle included in the streaming data received from the vehicle. In a similar manner, the second team of engineers may select a different configuration for a second vehicle shadow that is from the perspective of the tires. The second vehicle shadow may include nodes that represent tire information, but may omit other types of information about the vehicle included in the streaming data received from the vehicle, such as engine information. In this way each team may construct a light-weight and manageable vehicle shadow that includes vehicle information relevant for the uses for which a respective perspective-based vehicle shadow was configured without carrying along a lot of un-needed vehicle data that is not relevant to the uses for which the respective perspective-based vehicle shadow was configured.

In some embodiments, multiple instances of a same vehicle shadow may be created or may be selected. For example, in some embodiments, a tree-structured instance type may be used for a vehicle shadow and/or alternatively a graph-based instance type may be used for the same vehicle shadow. The tree-structure may be loss costly to store and maintain but may lack relationship information available in the graph structure. Likewise, the graph-structure may provide more insight into relationships between nodes, but may be more costly to store and maintain. Thus, different users may select different instance types for their vehicle shadows based on how the vehicle shadows are to be used. For example, for vehicle shadows comprising a large number of data points, a tree-structure may be more manageable than a graph-structure. However, for more focused perspective-based vehicle shadows, a graph structure may be a better choice.

In some embodiments a graph-based user interface may be used with either instance type, such as a graph query language (graph QL) interface. The graph QL interface may traverse the branches of the tree to locate data items targeted by a query in vehicle shadows formatted using a tree-structure. For vehicle shadows formatted using a graph-structure, a query engine may traverse the nodes of the graph to locate data items targeted by a query. In the tree-structure vehicle shadow instance type, there can be multiple pointers to the same piece of information (e.g., node).

In some embodiments, an agent or software development kit is uploaded onto a vehicle computing device, such as an electronics control unit (ECU) and the agent or SDK may enable vehicle state changes to be propagated from a vehicle shadow service to the vehicle itself.

In some embodiments, a vehicle shadow service includes an application programmatic interface for receiving state change requests directed to the vehicle shadow and by extension directed to the vehicle. Received vehicle state change requests may be stored in an update queue and sent to the vehicle to be applied. The vehicle shadow state may be updated based on received sensor data included in streaming data received from the vehicle. Since the vehicle shadow is updated based on actually sensed states of the vehicle as reflected in the streaming data, the vehicle shadow is not updated while a state change request is pending and stored in the update queue. Also, state change requests in the update queue may be invalidated, for example if a vehicle state changes such that the request is no longer valid, the request expires, or a subsequently received request renders a previously received request moot. Because there may be multiple vehicle shadows for a same vehicle, a centralized system (e.g., vehicle shadow management sub-system) manages updates provided to the various vehicle shadows.

In addition to multiple vehicle shadows from different perspectives, there may be multiple vehicle shadows in different data jurisdictions. Thus, a vehicle shadow management sub-system may interface with a data jurisdiction service to determine which data jurisdiction is the authoritative data jurisdiction for the vehicle.

In some embodiments, a vehicle may include a "message received" sensor that confirms receipt of a state change request sent to the vehicle. The output of the "message received" sensor may be included in the sensor data of the data stream provided to the vehicle shadow service.

Figure 4:
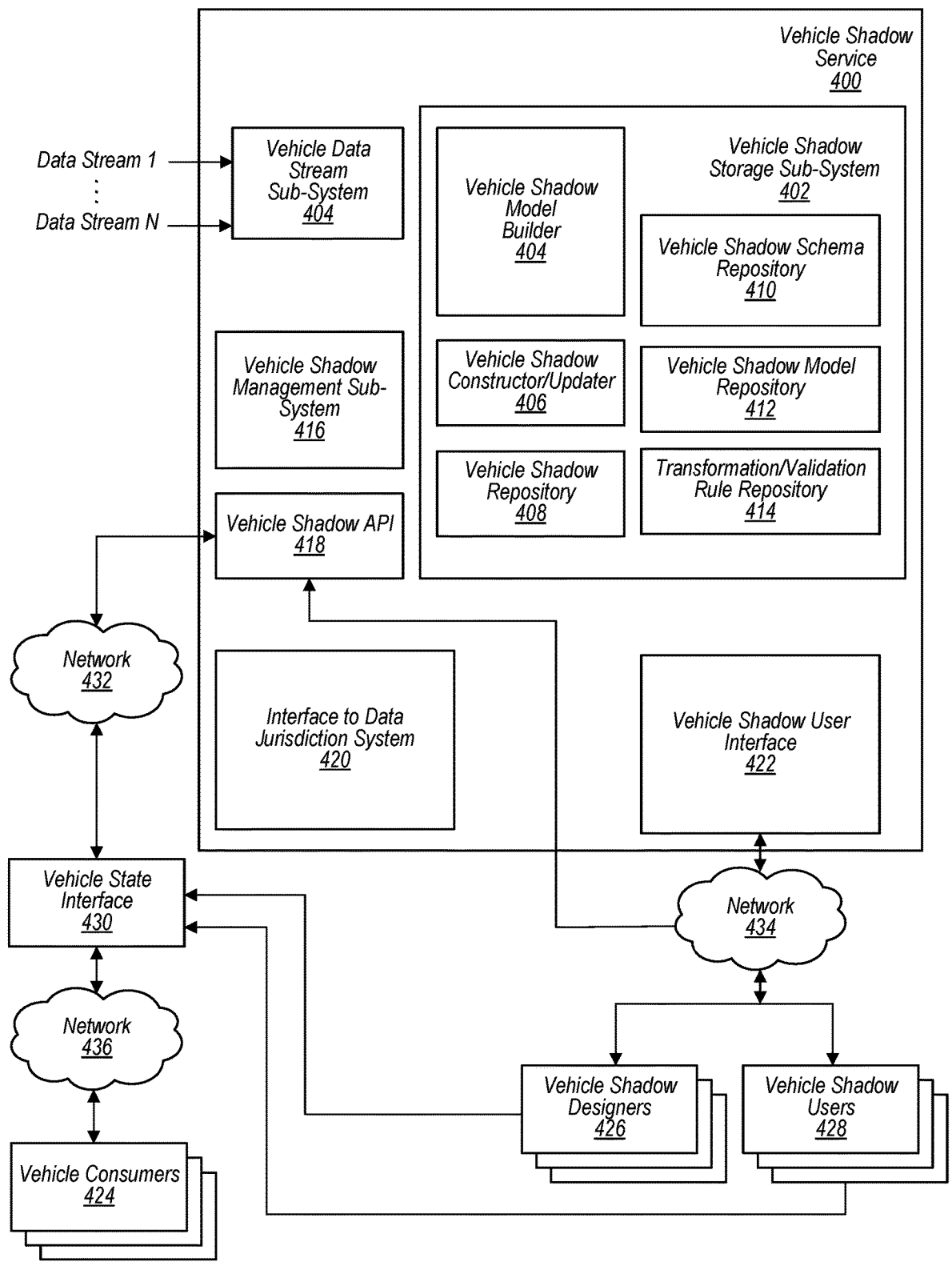
FIG. 4 illustrates an example vehicle shadow service that includes a vehicle shadow storage sub-system comprising a vehicle shadow model builder, which may be used to build a model for a vehicle shadow to be stored in the vehicle shadow storage sub-system.

FIG. 1 illustrates a vehicle shadow storage system 402, which may be a sub-system of a vehicle shadow service 400, as illustrated in more detail in FIG. 4. The vehicle shadow storage system 402 is configured to maintain a plurality of vehicle shadows representing different perspectives of a same vehicle, according to some embodiments.

In some embodiments, a vehicle data stream sub-system 112 receives disaggregated vehicle data from a plurality of heterogenous sources, such as vehicle information received from a manufacturer 102, sales information 104, servicing information 106, and vehicle information received from various sensors of the vehicle, such as vehicle sensor groups 1 through N (e.g., 108 through 110). A vehicle shadow model builder, such as vehicle shadow model builder 116 or 124, reads a catalog of available vehicle information included in the ingested data streams. For example, manufacturing information 102 or sales information 104 may indicate what sensors are included in a vehicle and may be used to generate a catalog accessed by vehicle shadow builder 116 or 124. A user, such as user A or user B may select sets of the sensors to be included in a respective perspective-based vehicle shadow, such as vehicle shadow A (120) or vehicle shadow B (128). In some embodiments, different sets of sensor data may be selected for different ones of the perspective-based vehicle shadows. For example, at least some sensors included in vehicle shadow A (120) may be different from at least some sensors included in vehicle shadow B (128). Also, each perspective-based vehicle shadow may include more or fewer sensors than other respective perspective-based vehicle shadows.

A vehicle shadow builder, such as vehicle shadow builder 118 or 126, builds and maintains the perspective-based vehicle shadows (e.g., vehicle shadow A (120) and vehicle shadow B (128)) using streaming data ingested by vehicle data stream sub-system 112. In some embodiments, vehicle shadow builder 118 or 126 may use a mapping as further discussed in FIGS. 16-22.

In some embodiments, user A or user B may specify operational characteristics for the vehicle shadows A (120) and B (128). For example, an access control rule or access control list (ACL) may be specified that limits access to the vehicle shadows via access boundary 114 or access boundary 122. In some embodiments, a user may specify other operational characteristics, such as replication rules for relocating a given vehicle shadow between data jurisdictions, encryption rules for defining types of sensor data included in a given vehicle shadow that is to be encrypted. In some embodiments, an access control list may limit access to the whole vehicle shadow or only to one or more nodes of the vehicle shadow. Likewise, the whole vehicle shadow or only one or more node may have their data encrypted.

In some embodiments, an operational characteristic that may be specified by a user and may include query interface rules for defining a query language to be used to query the vehicle shadow.

In some embodiments, users A and B may specify configurations to be used for the respective vehicle shadows using a user interface provided by a vehicle shadow service, such as user interface 422 shown in FIG. 4. In some embodiments, the user interface may include a command line interface, a graphical user interface, a web-based user interface, an application programmatic interface, or other suitable interface. In some embodiments, a same or different user interface may be used for configuring the vehicle shadows and querying the vehicle shadows.

In some embodiments, users A and users B may have different accounts with the vehicle shadow storage system 402, wherein user A's account boundary is demarcated via access boundary 114 and user B's account boundary is demarcated via access boundary 122.

Figure 2:
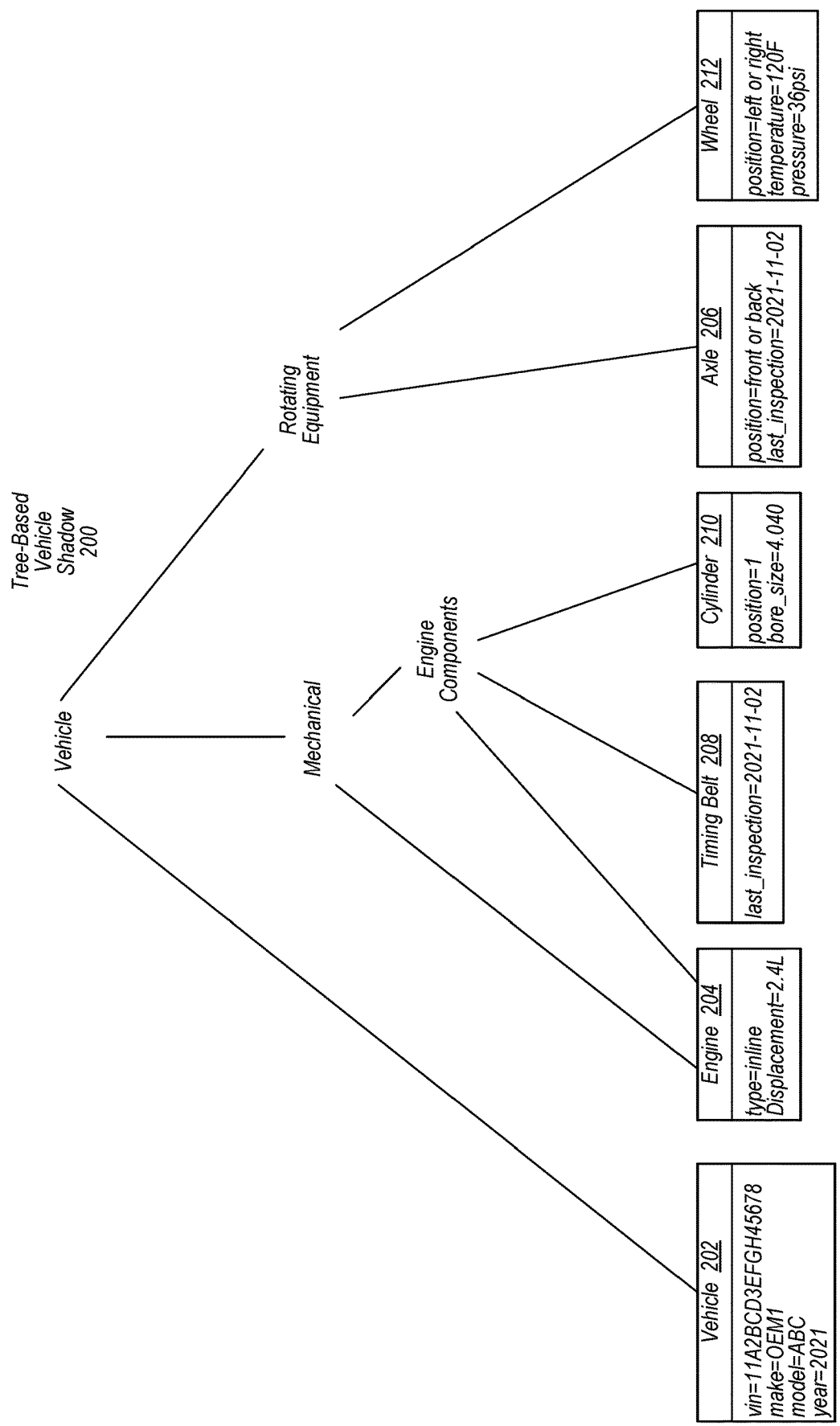
FIG. 2 illustrates a tree-based structure that may be used to organize nodes of a vehicle shadow, according to some embodiments.

FIG. 2 illustrates a tree-based structure that may be used to organize nodes of a vehicle shadow, according to some embodiments.

In some embodiments, a vehicle shadow, such as vehicle shadow A (120) or vehicle shadow B (128) may comprise nodes representing vehicle data that is kept up-to-date. The nodes may be organized using a tree structure. For example, in FIG. 2 tree-based vehicle shadow 200 includes leaf nodes 202, 204, 206, 208, 210, and 212. A tree structure organizes the leaf nodes, but higher-level nodes and branches of the tree do not include vehicle data. For example, leaf node 202 includes vehicle information and can be reached via a branch from "vehicle". Also leaf node 204 includes vehicle information and can be reached via a sub branch off of "vehicle" that connects to "mechanical" and further branches down to leaf node 204. Alternatively leave node 204 can be reached via sub-branches that go from "vehicle" to "mechanical" to "engine components." Thus, there may be multiple taxonomies that link to a same leaf node, wherein the leaf node is mapped to an attribute updated using streaming data, for example for a given sensor of the vehicle. As another example, leaf node 208 includes timing belt information and leaf node 210 includes cylinder information. These leaf nodes can be reached as branches of "engine components" which is a branch of "mechanical" which is a branch of "vehicle." Also, leaf nodes 206 and 212 include vehicle information for the axels and wheels, respectively. They can be reached as respective branches for "rotating equipment" off of "vehicle". Note that FIG. 2 illustrates a simplified example. In some embodiments, a tree-based structure used for a vehicle shadow may include more or fewer nodes along with more or fewer levels of branches, etc. However, a tree-based structure simplifies storage because the leaf nodes may point to data objects, such as may be stored in a key-value database, and the higher-level branches do not link to the key-value database. Thus, in order to respond to a query, the tree-based structure may be traversed to locate a targeted node, and the vehicle information for the targeted node may be retrieved from a database at a location indicated via a pointer of the leaf node. In some embodiments, multiple tree structures may be used to map to the same data objects in the data base. For example, in situations in which vehicle shadow A (120) and vehicle shadow B (128) include some of the same nodes, these nodes may link to a same database entry. For example, if the tire focused vehicle shadow includes a node for "vehicle speed" and the tire focused vehicle shadow includes a node for "vehicle speed", the two trees may both have separate leaf nodes for "vehicle speed" that are mapped to a same attribute in a schema, which may be stored as a single data object in a database, as an example.

Figure 3:
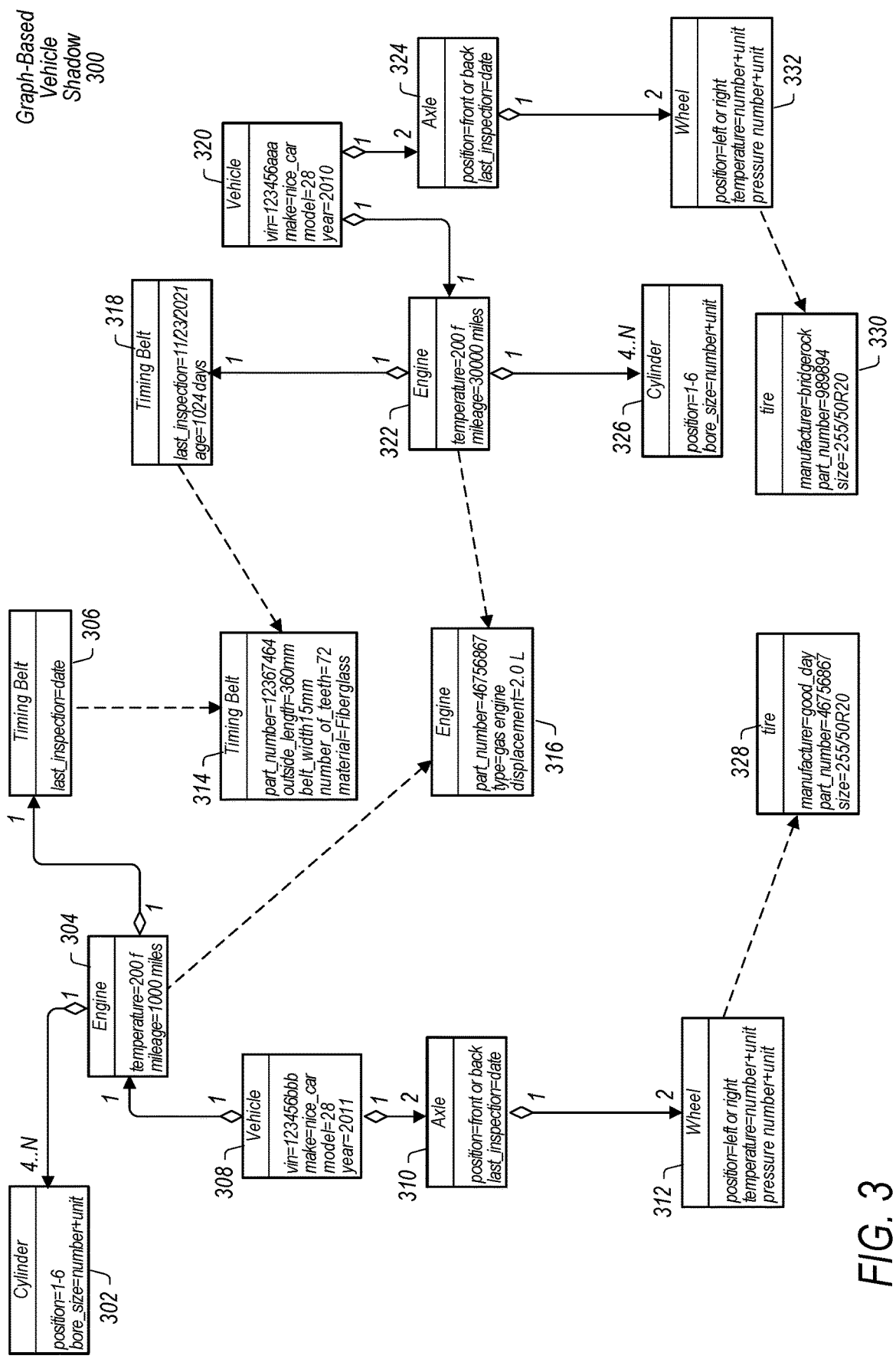
FIG. 3 illustrates a graph-based structure that may be used to organize nodes of a vehicle shadow, according to some embodiments.

FIG. 3 illustrates a graph-based structure that may be used to organize nodes of a vehicle shadow, according to some embodiments.

As an alternative to a tree-based structure, in some embodiments, the same vehicle shadow service may additionally or alternatively offer a graph-based vehicle shadow instance type, wherein vehicle information is linked to nodes of the graph that are connected via edges that represent relationships between the nodes. For example, graph-based vehicle shadow 300 includes vehicle 308, which is linked to engine information 304 and axle information 310. Engine information 304 is further linked to cylinder data 302 and timing belt information 306, wherein engine information 304 shares an edge with engine part information 316 which also shares an edge with engine information 322 for vehicle 320. Likewise, timing belt information 306 shares an edge with timing belt part information 314 which in turn shares an edge with timing belt information 318 which shares an edge with engine 322 of vehicle 320. Engine information 322 also shares an edge with cylinder information 326 (for vehicle 320). Looking back to axle information 320 for vehicle 308, the axle information shares an edge with wheel information 312, wherein part information for tires of the wheel is shown in 328. Looking over to axle information 324 for vehicle 324, wheel information 332 shares an edge with axel information 324 and also shares an edge with tire part information 330.

As can be seen a graph-based vehicle shadow, such as graph-based vehicle shadow 300, includes more relationship information between components than a tree-based structure, but is also more complex. Also, a graph-based structure enables associating a part property node with a component data node. For example, engine information 304 showing engine temperature and miles can share an edge (and therefore relationship) with engine part information 316 indicating an engine part number, engine type (e.g., electric or gas), an engine size (e.g., 2.0L, etc.). Likewise, a graph-based structure allows multiple component data nodes to be associated with a common part property node. For example, both engine information 304 and engine information 322 are associated with engine party property 316.

FIG. 4 illustrates an example vehicle shadow service that includes a vehicle shadow storage sub-system comprising a vehicle shadow model builder, which may be used to build a model for a vehicle shadow to be stored in the vehicle shadow storage sub-system. FIG. 4 also illustrates a vehicle shadow management sub-system that enables state changes to be queued, sent to a vehicle, reflected in an updated vehicle shadow, and/or invalidated, if necessary, along with other components, according to some embodiments.

Vehicle shadow service 400 includes vehicle shadow storage sub-system 402, wherein vehicle shadow storage sub-system 402 includes vehicle shadow model builder 404, which may interface with vehicle shadow schema repository 410, vehicle shadow model repository 412, and transformation/validation rule repository 414. The vehicle shadow model builder 404 may use a user selected or defined model stored in vehicle model repository 412 to build a vehicle shadow. Additionally, the vehicle shadow model builder 404 may use a user defined schema and/or user defined transformation rules, which may be stored in vehicle shadow schema repository 410 and transformation/validation rule repository 414, respectively. In some embodiments, a model for a vehicle shadow may comprise a user selection of sensors for which streaming data is to be included in the vehicle shadow. For example, user A from FIG. 1 may define an engine focused model and user B may define a tire focused model. In some embodiments, a schema, transformation rules, and the selection of attributes to include in a vehicle shadow may be separated out into separate entities, such as a schema, transformation rules, and a model, or they may be collapsed into a single "model" entity that defines what streaming data components are to be included in a vehicle shadow, what schema is to be used for mapping the vehicle shadow, and what transformation rules are to be applied to mapped data in the vehicle shadow.

Figure 12:
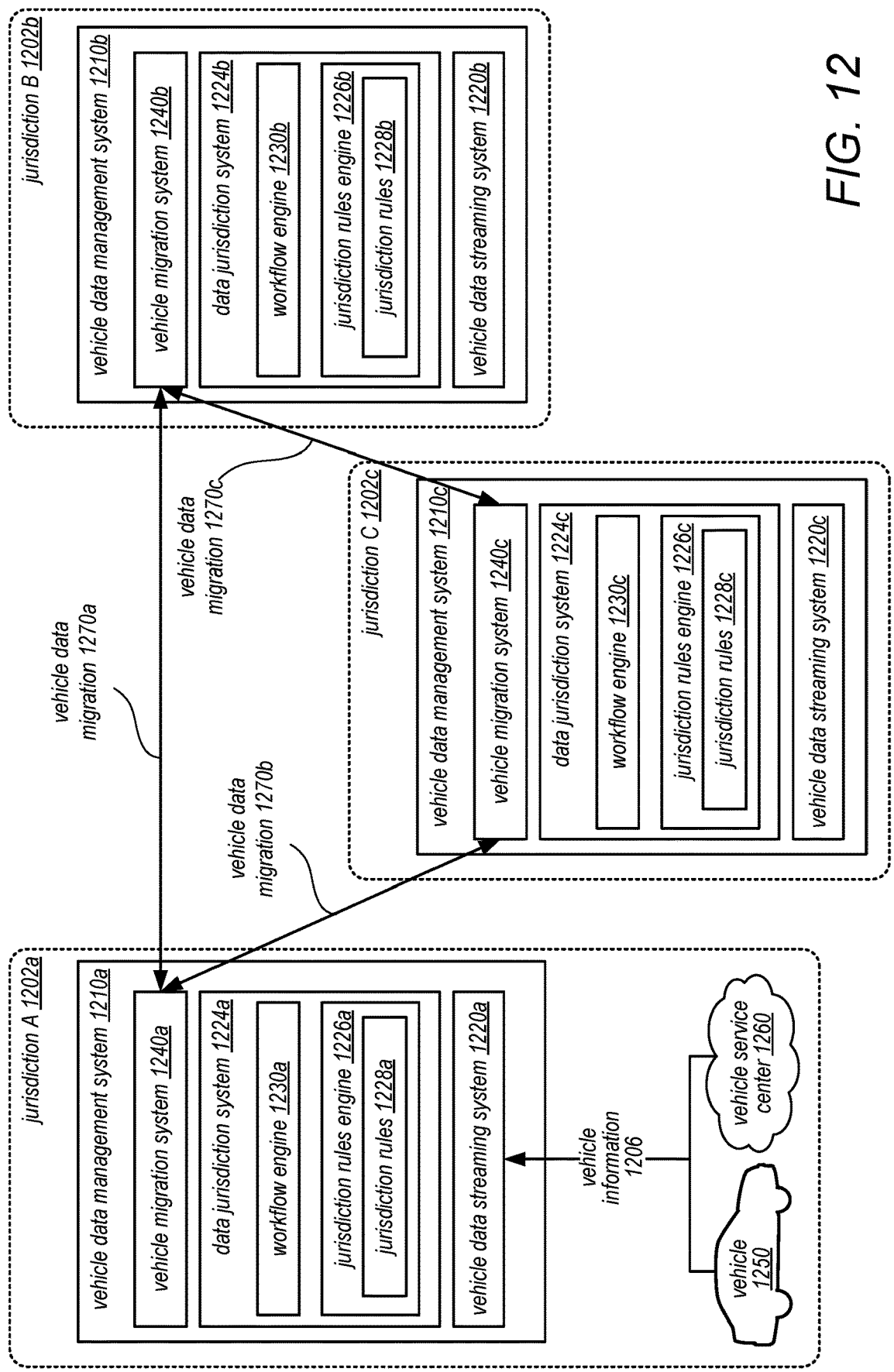
FIG. 12 illustrates a data jurisdiction system that determine a change in jurisdiction of a vehicle. The data jurisdiction system determines one or more actions to take in response to the change in jurisdiction of the vehicle based on a set of jurisdiction rules. Additionally, the data jurisdiction system resolves conflicts between jurisdiction rules of different jurisdictions, and a data management system migrates data of the vehicle, such as a vehicle shadow, to one or more other jurisdictions, if applicable, in accordance with the de-conflicted jurisdiction rules, according to some embodiments.

Also, vehicle shadow service 400 includes a vehicle shadow management sub-system 416 that enables state changes to be queued, sent to a vehicle, and/or invalidated, if necessary. Additionally, vehicle shadow service 400 includes vehicle shadow API 418, and interface to data jurisdiction system 420, which may interface with a data jurisdiction system, such as shown in FIG. 12. Also, vehicle shadow service 400 includes vehicle shadow user interface 422, which may enable users, such as users A and B described in FIG. 1, to select a configuration for their respective vehicle shadows and/or query data included in their respective vehicle shadows.

In some embodiments, a vehicle supplier or other third-party may implement a vehicle state interface 430, such as a web-based application configured to provide vehicle consumers 424 with an interface with which to view and interact with a vehicle shadow. Vehicle consumers 424, vehicle shadow designers 426, and/or vehicle shadow users 428 (such as users A and B described in FIG. 1) may submit vehicle state change requests via vehicle state interface 430, and the vehicle state interface 430 may make API calls to vehicle shadow API 418 to submit vehicle state change requests to vehicle shadow management sub-system 416. Also, vehicle shadow designers 426 and vehicle shadow users 428 may make API calls directly to vehicle shadow API 418 via network 434. The process for receiving, queuing, submitting or invalidating vehicle state change requests is described in further detail with regard to FIGS. 8-15. Also, the vehicle shadow model builder is described in further detail with regards to FIGS. 16-22.

Vehicle shadow service 400 also includes vehicle data stream sub-system 404 (which may be similar to vehicle data stream sub-system 112 described in FIG. 1), vehicle shadow constructor/updater 406 (which may be similar to vehicle shadow builder 116 described in FIG. 1) and vehicle shadow repository 408 which may store vehicle shadows, such as vehicle shadows 120 and 124 shown in FIG. 1. Also, vehicle shadow repository 408 may manage and enforce operational characteristics for the vehicle shadows, such as access boundaries 114, 122. Other operational characteristics managed or enforced by vehicle shadow repository 408 may include an access control list for nodes of the vehicle shadows (or the whole vehicle shadows), encryption of vehicle information of the vehicle shadows, etc. In some embodiments, a user interface configuration for a given vehicle shadow may be stored as metadata with the vehicle shadow stored in vehicle shadow repository 408 and may be used by vehicle shadow user interface 422 to configure a user interface to enable vehicle shadow users 428 to access the vehicle shadow or data included in the vehicle shadow. In some embodiments, networks 432, 434, and 436 may be the same or different networks. For example, in some embodiments, vehicle shadow designers 426 and vehicle shadow users 428 may be connected to vehicle shadow service 400 via a public network such as the Internet, or may be connected via a private network connection such as direct connection between a customer and service provider network hosting vehicle shadow service 400. Also, network 432 or 434 may be a public or private network and in some embodiments, network 436 may be a public network, such as the Internet, or a private network such as a network operated by a vehicle manufacturer to connect the vehicle to external services.

Figure 5:
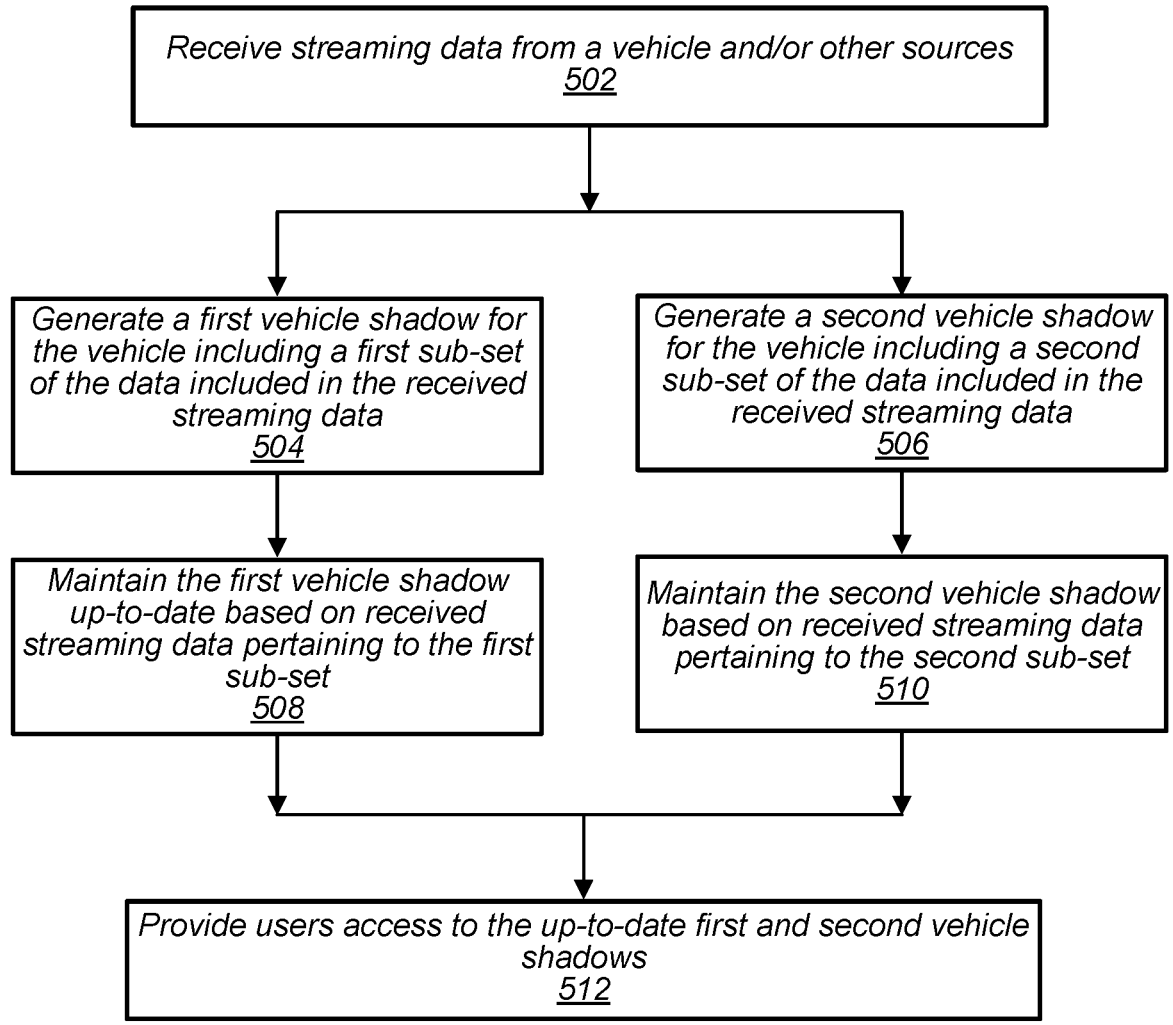
FIG. 5 is a flow diagram illustrating an example process for generating and maintaining perspective-based vehicle shadows for a vehicle, according to some embodiments.

FIG. 5 is a flow diagram illustrating an example process for generating and maintaining perspective-based vehicle shadows for a vehicle, according to some embodiments.

At block 502, a vehicle shadow service receives streaming data from a vehicle or other sources. At block 504 a first vehicle shadow for the vehicle is generated (e.g., a first perspective-based vehicle shadow), wherein the first vehicle shadow includes data for a first sub-set of sensors for which sensor data is included in the streaming data. At block 506, a different perspective-based vehicle shadow (e.g., a second vehicle shadow) is generated that includes at least some different (or fewer/more) sensors than the first vehicle shadow. At block 508, the first vehicle shadow is maintained to be up-to-date using the streaming data and concurrently at block 510 the second vehicle shadow is maintained to be up-to-date using the streaming data. Note that in some embodiments different sensors included in different ones of the vehicle shadows may generate sensor measurements at different frequencies. In some embodiments, the first and second vehicle shadows may be updated as new sensor data is received, at whatever rate the sensor data is generated by the sensor and received by the vehicle shadow service.

At block 512, the vehicle shadow service provides a user interface that allows users to access the up-to-date vehicle shadows (e.g., from either perspective).

Figure 6:
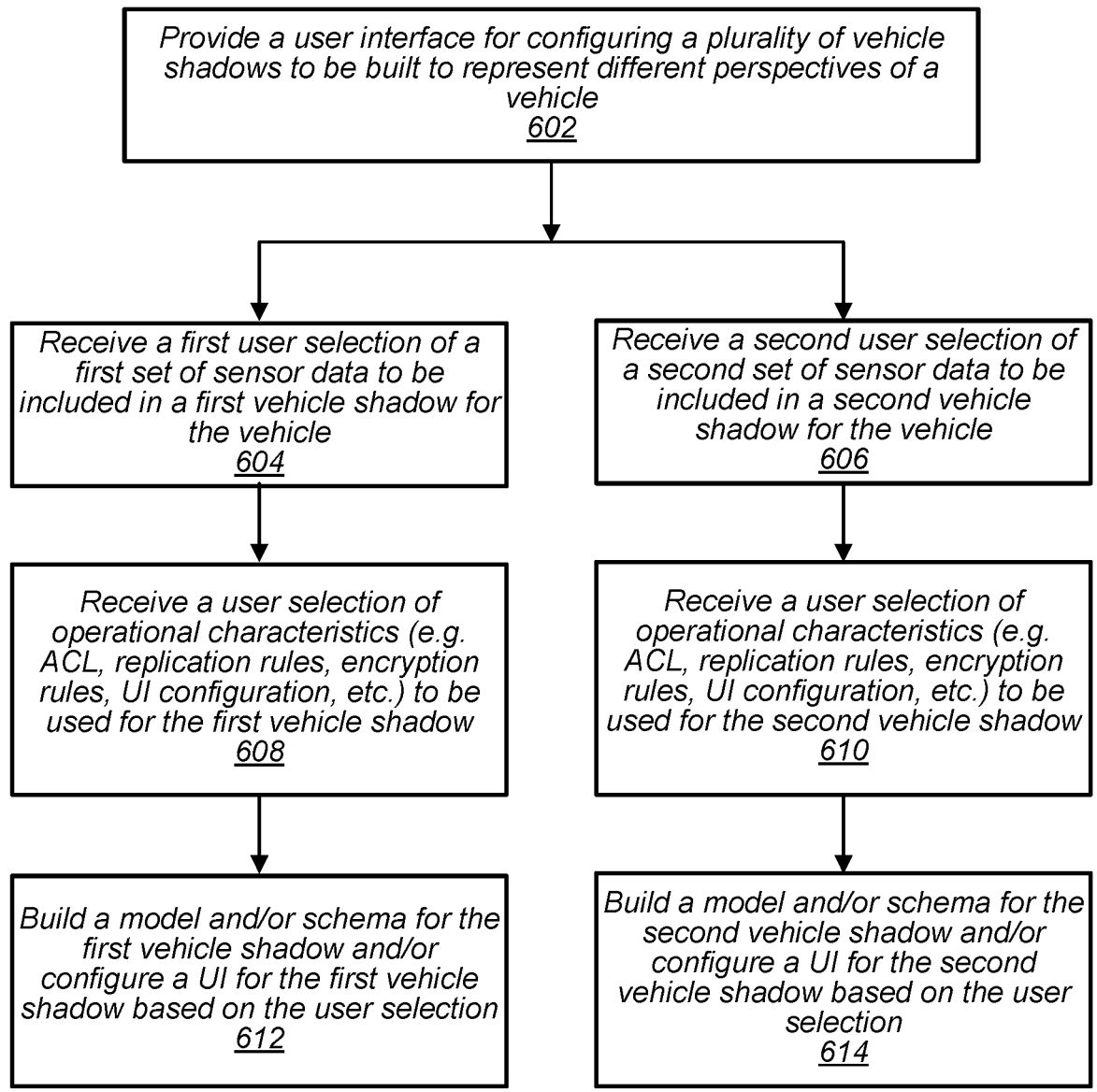
FIG. 6 is a flow diagram illustrating a process that enables a user of a vehicle shadow service to select different sensor configurations for sensor data to be included in perspective-based vehicle shadows that represent different perspectives of a same vehicle, according to some embodiments.

FIG. 6 is a flow diagram illustrating a process that enables a user of a vehicle shadow service to select different sensor configurations for sensor data to be included in perspective-based vehicle shadows that represent different perspectives of a same vehicle, according to some embodiments.

At block 602, a vehicle shadow service provides a user interface for configuring a plurality of vehicle shadows to be built to represent different perspectives of a vehicle. At blocks 604 and 606 a first and second user selection are received for a first and second set of sensors to be included in a first and second (or Nth) vehicle shadows. Also, at blocks 608 and 610 respective sets of user-selected operational characteristics to be applied for the first and second (or Nth) vehicle shadows are received. Then, at blocks 612 and 614 respective models and associated schema are built for the first and second vehicle shadows. The models and/or schema may then be used to generate and maintain the first and second vehicle shadows as described in blocks 504, 506, 508, and 510 of FIG. 5.

Figure 7:
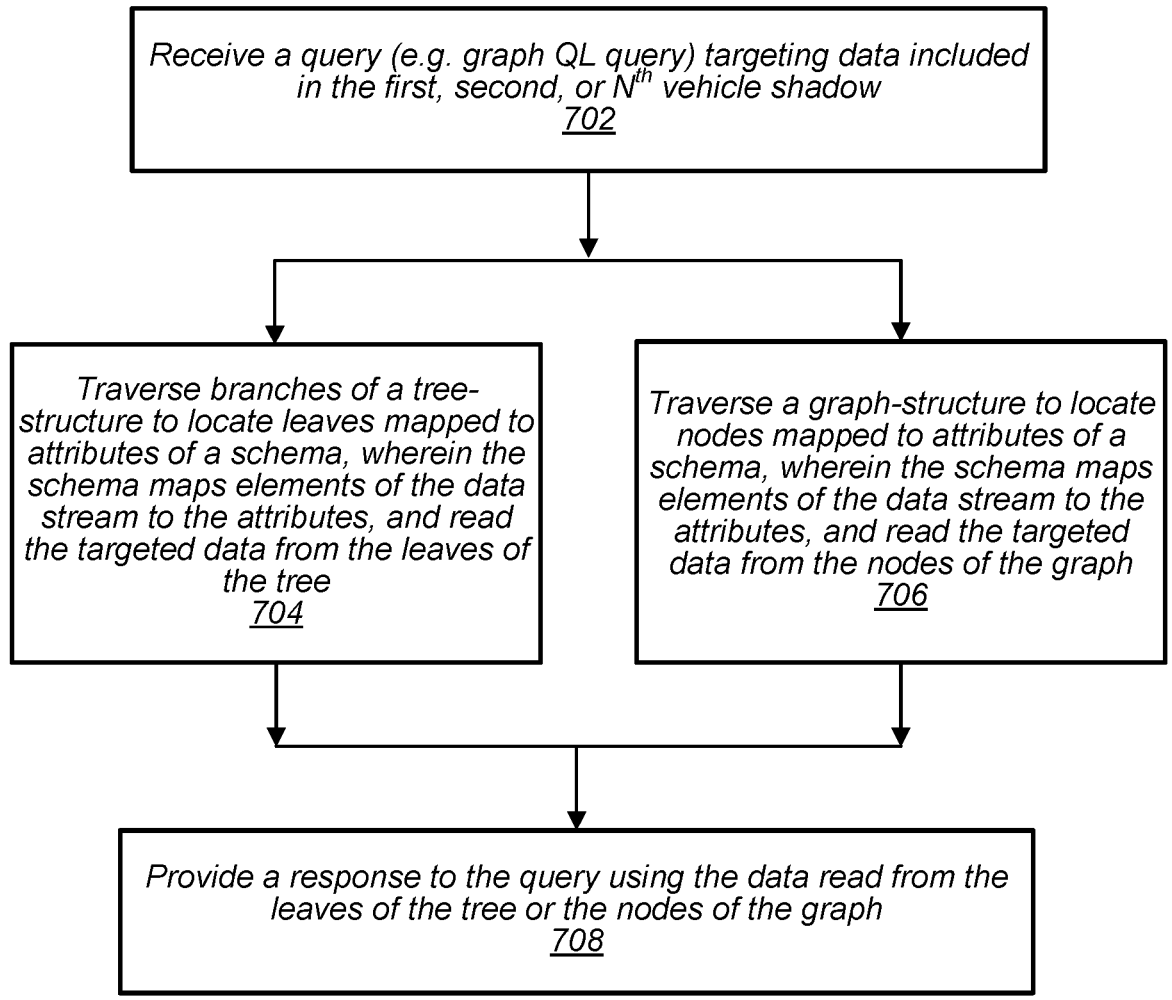
FIG. 7 is a flow diagram illustrating a process of responding to a query targeting data included in a vehicle shadow, according to some embodiments.

FIG. 7 is a flow diagram illustrating a process of responding to a query targeting data included in a vehicle shadow, according to some embodiments.

At block 702, a vehicle shadow service receives a query targeting data included in a vehicle shadow. The query may be formatted as a graph QL query in some embodiments (regardless of whether or not the vehicle shadow uses a tree-based instance type or a graph-based instance type). For example, if a tree-based instance type, at block 704 branches of the tree are traversed to locate leaves mapped to attributes of a schema, wherein the schema maps elements of the data stream to the attributes. The targeted data may then be read from the leaves of the tree. Or, if a graph-based instance type, at block 706, a graph-structure is traversed to locate nodes mapped to attributes of a schema, wherein the schema maps elements of the data stream to the attributes. The targeted data may then be read from the nodes of the graph.

At block 708, a response to the query received at 702 is provided using the data read from the leaves of the tree or the nodes of the graph.

Figure 8:
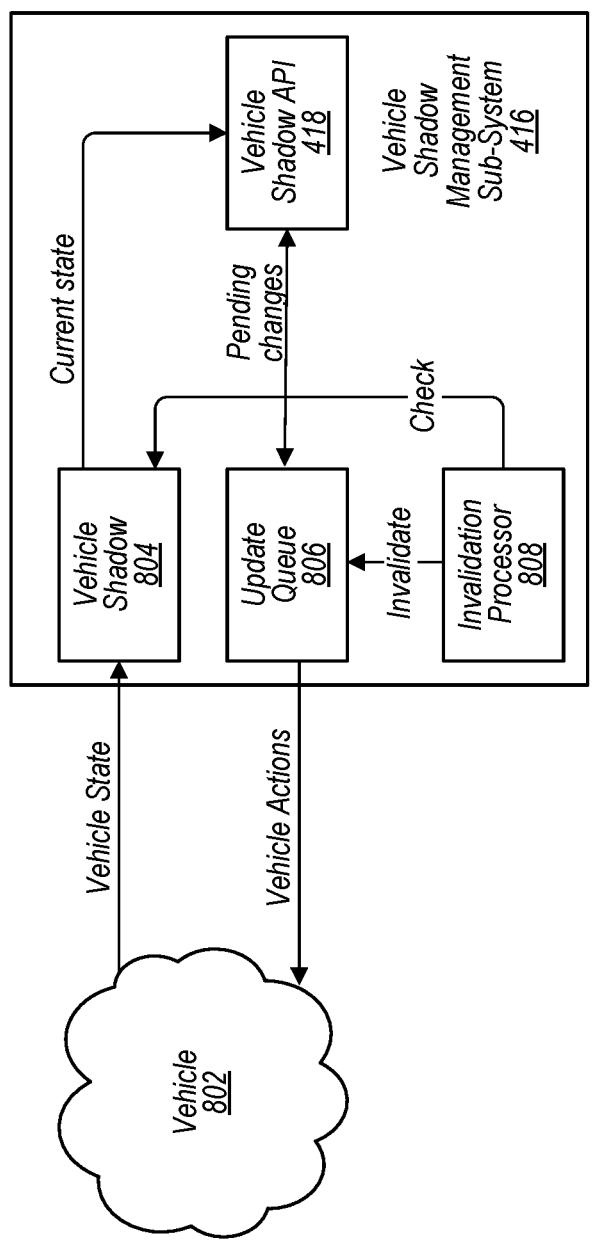
FIG. 8 illustrates additional details of a vehicle shadow management sub-system, wherein the vehicle shadow management sub-system includes an update queue, an invalidation processor, and a vehicle shadow update API. The invalidation processor invalidates requests in the queue, if subsequent events such as a change in vehicle state or an expiration render the pending requests invalid. Also, the vehicle shadow is only updated based on sensor data from the vehicle such that invalid requests are not reflected in a state of the vehicle shadow, according to some embodiments.

FIG. 8 illustrates additional details of a vehicle shadow management sub-system, wherein the vehicle shadow management sub-system includes an update queue, an invalidation processor, and a vehicle shadow update API. The invalidation processor invalidates requests in the queue, if subsequent events such as a change in vehicle state or an expiration render the pending requests invalid. Also, the vehicle shadow is only updated based on sensor data from the vehicle such that invalid requests are not reflected in a state of the vehicle shadow, according to some embodiments.

In some embodiments, a vehicle shadow management sub-system 416, such as also illustrated in FIG. 4, includes an update queue 806 for a vehicle 802 represented by vehicle shadow 804. Additionally, the vehicle shadow management sub-system 416 includes (or interacts with) a vehicle shadow API 418 that receives state change requests for vehicle 802. State change requests received via API 418 are added to update queue 806. While in the update queue invalidation processor 808 checks vehicle shadow 808 to determine whether a change in vehicle state has been indicated in received streaming data, wherein the change in vehicle state renders the state change request invalid. If so, the pending state change request is invalidated in update queue 806 and is not sent to vehicle 802. If the state change request is valid, it is sent as a vehicle action to be performed at vehicle 802. Once the vehicle action is performed and indicated in the streaming data received from the vehicle at the vehicle shadow 804 (e.g., in an updated vehicle state), the vehicle shadow 804 is updated to show the new state of vehicle 802 with the vehicle action performed. In some embodiments, pending state change requests may be invalidated based on subsequently received state change requests, or expiration of a state change request.

Also, in some embodiments, API 418 may provide users, such as vehicle consumers, vehicle shadow users, and/or vehicle shadow designers information about a current state of the vehicle shadow 804.

Figure 9A:
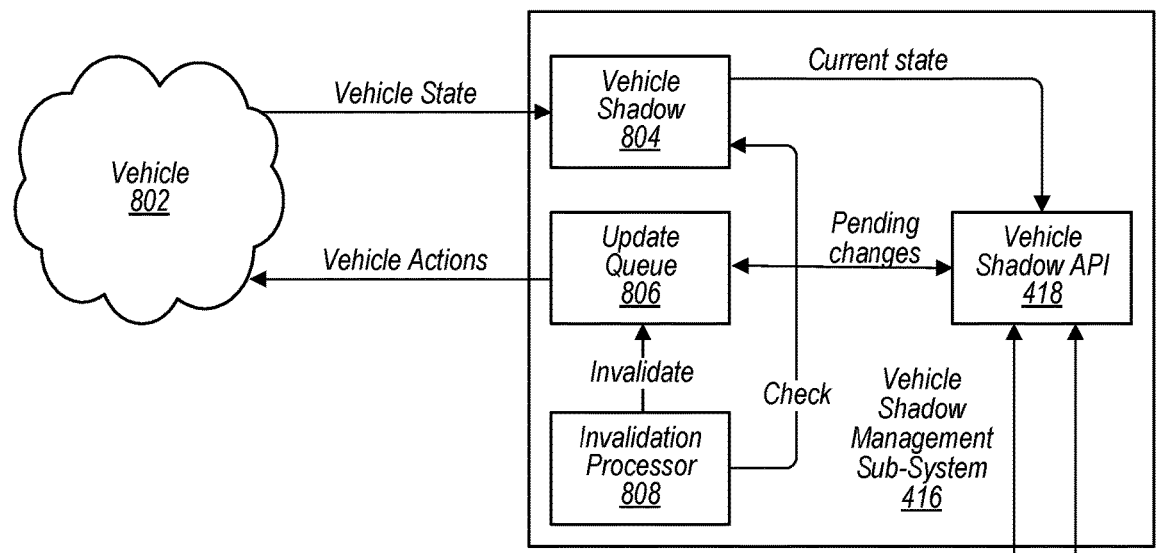
FIGS. 9A/9B illustrate sequentially received state change requests, wherein a subsequently received state change requests renders a pending state change request invalid, according to some embodiments.

FIGS. 9A/9B illustrate sequentially received state change requests, wherein a subsequently received state change requests renders a pending state change request invalid, according to some embodiments.

Figure 9B:
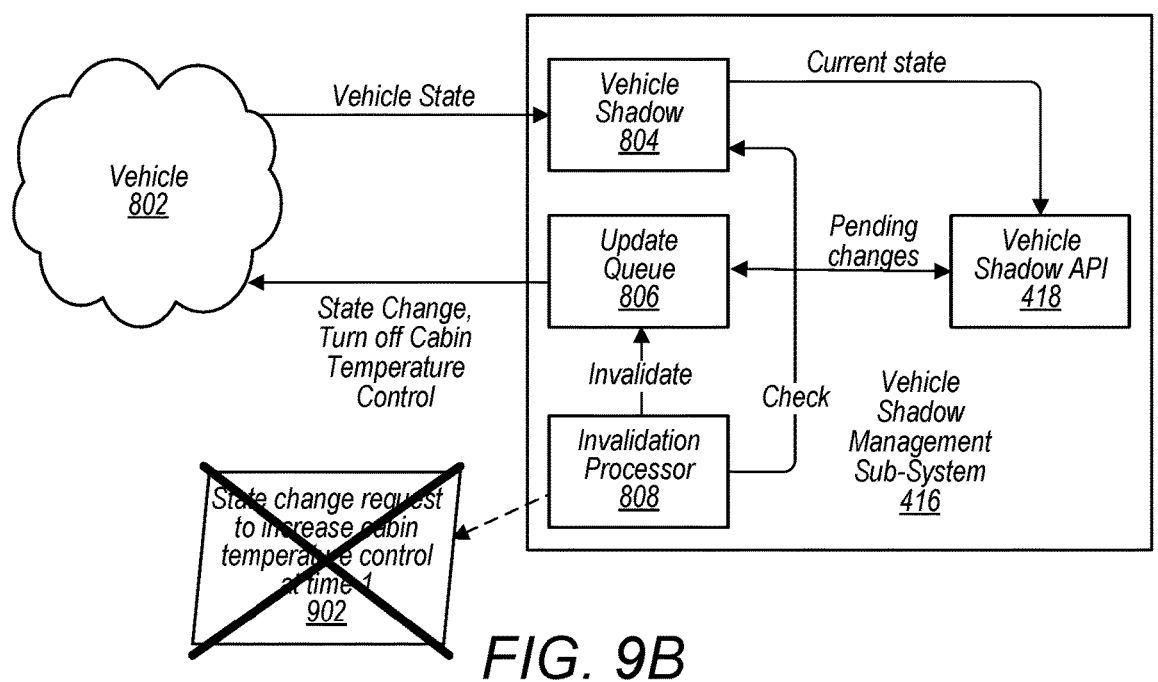

For example, a first state change request 902 may be received at API 418 at time 1, wherein the first state change request is to increase the cabin control temperature. Also, state change request 904 may be received at API 418 at time 2, wherein the second state change request is to turn off cabin temperature control. In some embodiments, the second request 904 may be received while the first request 902 is still stored in the update queue 806. Since turning off the cabin temperature control renders the request to increase cabin temperature control moot, the invalidation processor 808 may invalidate the first request 902 and only send the second request 904 to vehicle 802, as shown in FIG. 9B.

Figure 10A:
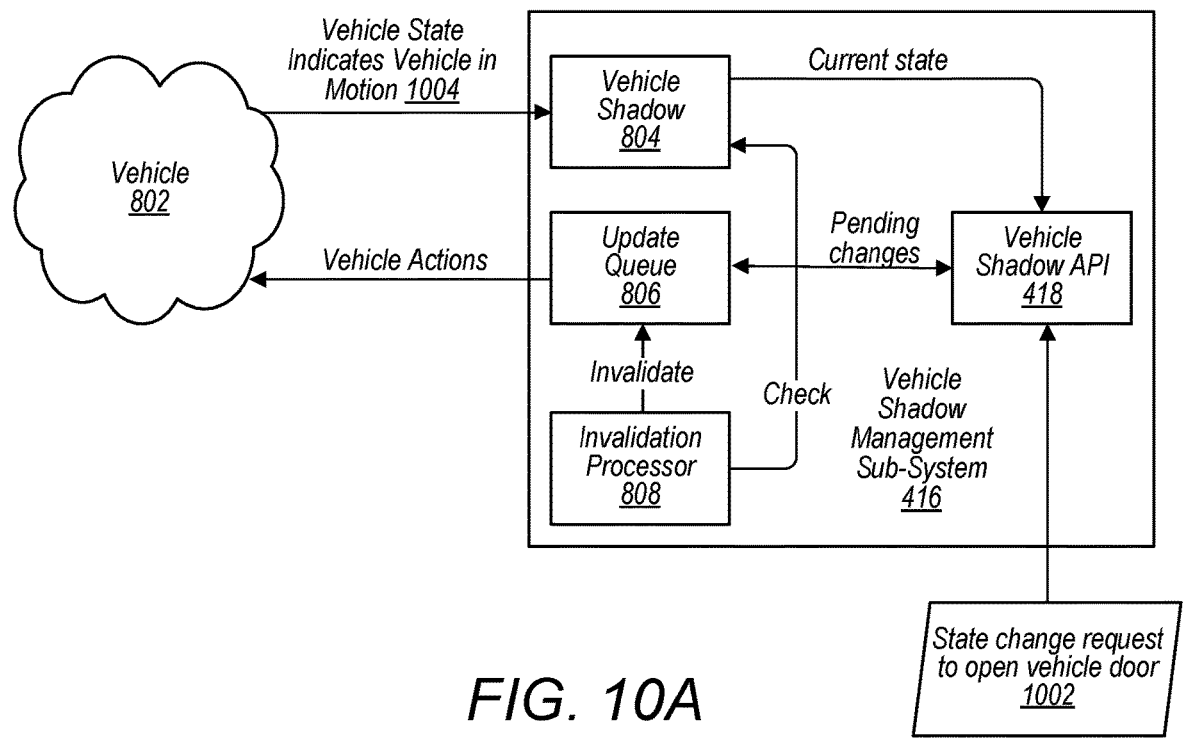
FIGS. 10A/10B illustrate a pending state change request that is rendered invalid based on a changed state of the vehicle indicated in the streaming data received from the vehicle, according to some embodiments.

FIGS. 10A/10B illustrate a pending state change request that is rendered invalid based on a changed state of the vehicle indicated in the streaming data received from the vehicle, according to some embodiments.

Figure 10B:
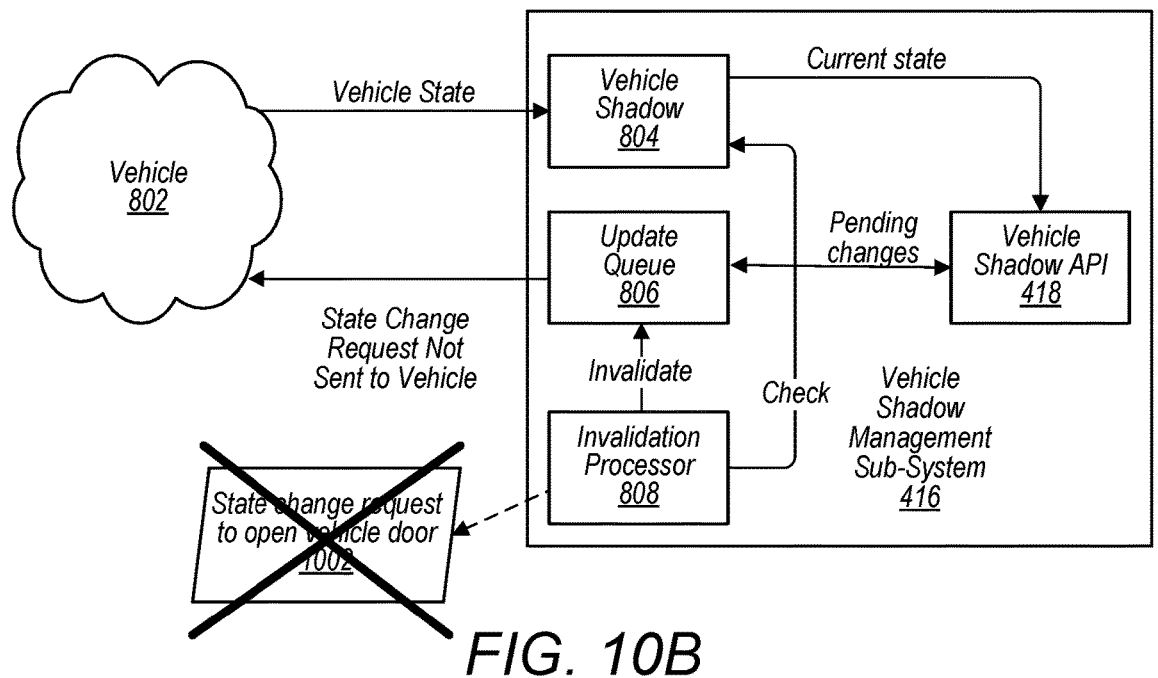

As another example, state change request 1002 may be received at API 418. However, while the state change request 1002 is still stored in the update queue 806, streaming data 1004 may indicate that vehicle 802 has changed state from a stopped state to an in-motion state. Invalidation processor 808, may check vehicle shadow 804 in an attempt to validate state change request 1002 and may determine (as shown in FIG. 10B) that the state change request 1002 is invalid given the current state of vehicle 802 as indicated in vehicle shadow 804.

Figure 11A:
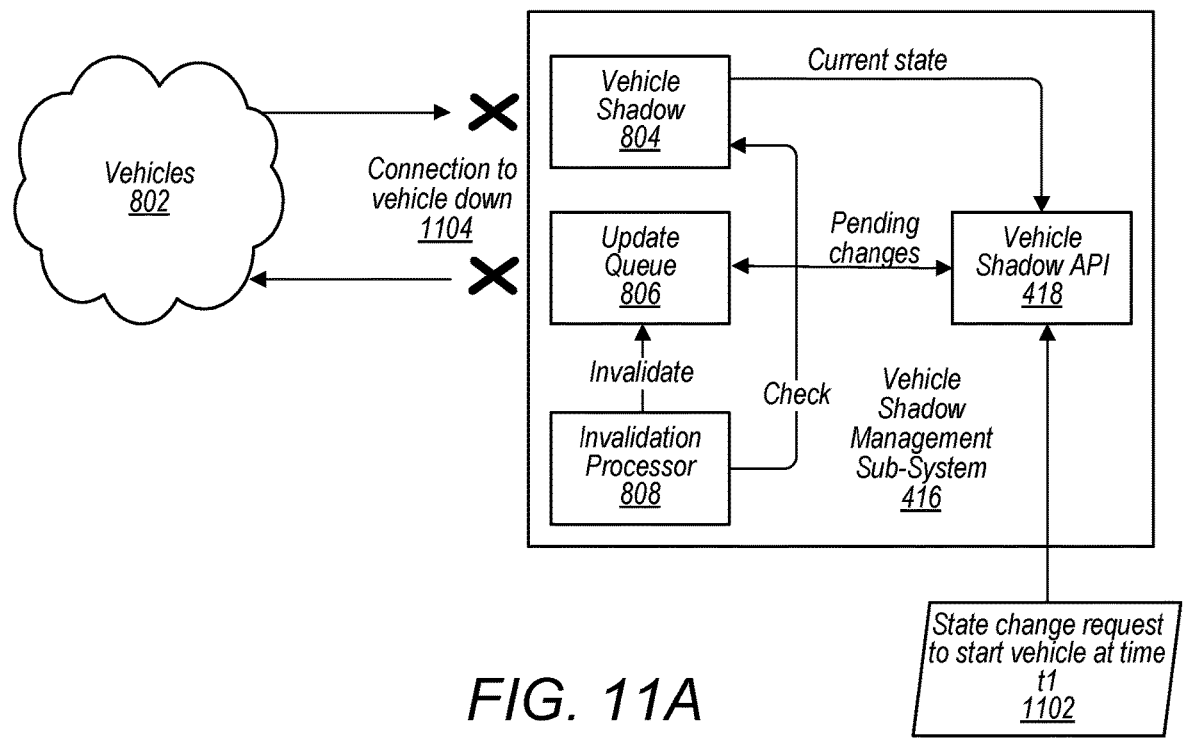
FIGS. 11A/11B illustrate a pending state change request that is rendered invalid based on an elapsed amount of time (e.g., expiration of the request), according to some embodiments.

FIGS. 11A/11B illustrate a pending state change request that is rendered invalid based on an elapsed amount of time (e.g., expiration of the request), according to some embodiments.

Figure 11B:
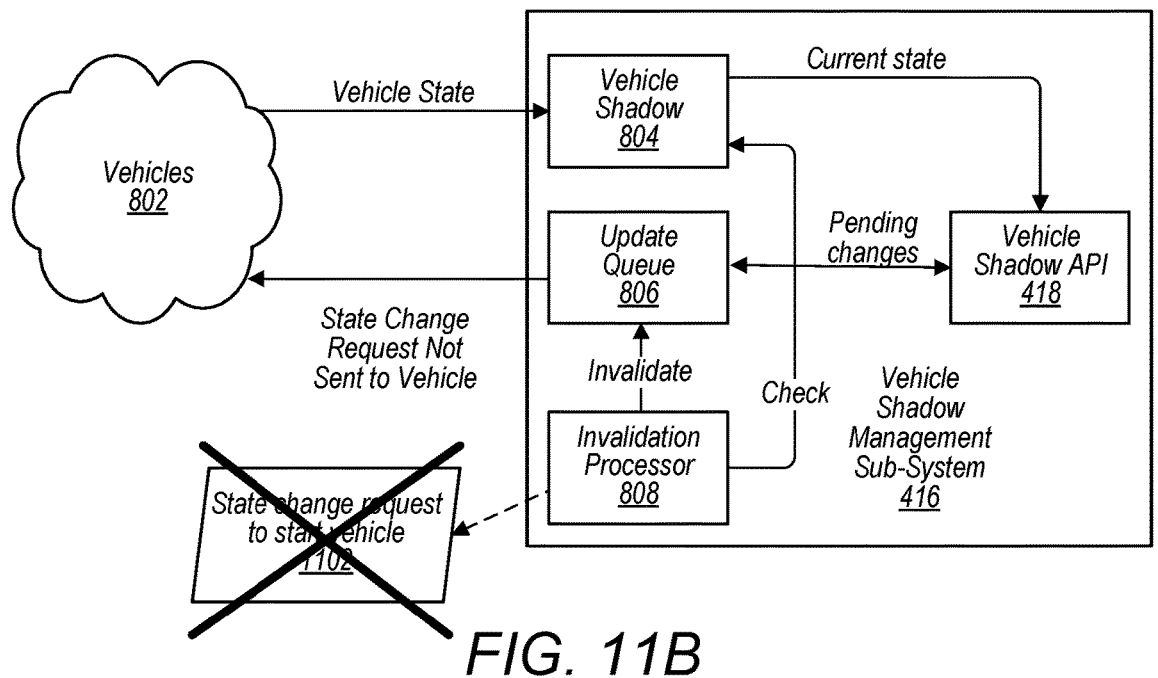

As yet another example, a state change request 1102 may be received via API 418 at time 1. The state change request may be a request to start vehicle 802. However, after a threshold amount of time has elapsed (wherein the threshold (D, as in delay) corresponds with an expiration time for the state change request 1102) the vehicle state information 1104 may not be received due to a loss of connection with vehicle 802. In response to the state change request expiring, invalidation processor 808 may invalidate state change request 1102, as shown in FIG. 11B.

FIG. 12 illustrates a vehicle data management system and data jurisdiction system that determines a change in the jurisdiction of a vehicle, resolves conflicts between jurisdiction rules (if necessary), and retains, deletes, or migrates data of the vehicle to one or more other jurisdictions, in accordance with the jurisdiction rules. Various vehicle data management systems 1210a, 1210b, and 1210c may be located in two or more jurisdictions, such as jurisdiction A 1202a, jurisdiction B 1202b, and jurisdiction C 1202c. The various jurisdictions may be a geographical area or territory within which authority to impact management of vehicle data are exercised. In some embodiments, the jurisdictions may be based on a country representing a distinct sovereign political entity such as the United States. In other embodiments, the jurisdictions may be based on states or localities that subdivide the country into separate jurisdictions such as California and San Francisco. Jurisdictions may further be comprised of multiple countries or states as well as be comprised of any number and/or combination of the various territories, such as the European Union. In some embodiments, there may be jurisdictions that have overlapping authority to impact the management of vehicle data.

The vehicle data management systems 1210a, 1210b, and 1210c may be comprised of respective vehicle data streaming systems 1220a, 1220b, and 1220c, (which may be a vehicle data stream subsystem 112 as shown in FIG. 1 or a vehicle data stream subsystem 404 as shown in FIG. 4) data jurisdiction systems 1224a, 1224b, and 1224c, and vehicle migration systems 1240a, 1240b, and 1240c. Although FIG. 12 depicts the respective vehicle data management systems 1210a, 1210b, and 1210c as being comprised of the respective components, the respective systems comprising the vehicle data management system may be outside of and independent from the vehicle data management systems 1210a, 1210b, and 1210c. In some embodiments, a vehicle shadow service, such as vehicle shadow service 400, may be included in a given one of the vehicle data management systems, such as vehicle data management systems 1210a, 1210b, and 1210c.

In some embodiments a vehicle 1250 may generate one or more vehicle information streams 1206 to send to the vehicle data streaming system 1220a. The vehicle 1250 may send vehicle information streams 1206 containing data such as video frames, images, radar amplitude, temperature data, engine speed, and other information about the vehicle 1250. The vehicle information 1206 may include Global Positioning System (GPS) information determined using cellular, wireless passive, satellite, and other types of GPS systems. In some embodiments, a geographic location of a vehicle 1250 may be determined in a variety of manners. For example, in some embodiments, a GPS may be used or a global navigation satellite system (GNSS) may be used. In some embodiments, a vehicle may determine its location using local sensors and/or algorithms, such as using computer vision, light detection and ranging (LIDAR), vehicle odometry, etc.

Although FIG. 12 depicts only the vehicle 1250 and a vehicle service center 1260 as generating the vehicle information 1206, any number of data sources inside or outside of the jurisdiction may contribute to the vehicle information 1206 sent to the vehicle data streaming system 1220a. The vehicle data streaming system 1220a may, in various embodiments, be an apparatus or system for managing the creation, storage, retrieval, and processing of large-scale vehicle data streams. The vehicle data streaming system 1220a may be designed to handle hundreds or even thousands of concurrent data producers and data consumers. The term "data stream", as used herein, refers to a sequence of vehicle data records that may be generated by one or more data producers (e.g., vehicle 1250, vehicle service center 1260) and accessed by one or more data consumer.

Once the vehicle data streaming system 1220a receives the vehicle information 1206 it may use the vehicle information 1206 to detect a jurisdiction change event. In some embodiments the detection of the change in jurisdiction of the vehicle 1250 may be performed by the data jurisdiction system 1224a, instead of the vehicle data streaming system 1220a. The jurisdiction change event may be inferred or deduced based upon a single clear indication of vehicle jurisdiction change such as registration information change from the vehicle service center 1260. In some embodiments, the jurisdiction change event may be detected based on a plurality of vehicle information signals such as GPS signals, vehicle service information, vehicle location history, etc. The jurisdiction change event furthermore may be detected or inferred based on one or more machine learning models trained using a past history of vehicle information 1206 and jurisdiction rules 128a.

The detected jurisdiction change event is then sent or requested by the data jurisdiction system 1224a, and the data jurisdiction system 1224a applies a set of jurisdiction rules 1228a to initiate vehicle data migrations 1270a, 1270b, 1270c respectively. Though in some embodiments, application of the set of jurisdiction rules may result in continued retention of vehicle data or deletion of vehicle data with or without migration. The data jurisdiction system 1224a may comprise a workflow engine 1230a and jurisdiction rules engine 1226a. The jurisdiction rules engine 1226a may have access to the set of jurisdiction rules 1228a and may utilize the jurisdiction rules 1228a to determine whether one or more portions of the vehicle data stored for the vehicle 1250 is to be deleted, moved, or retained in a certain jurisdiction. The set of jurisdiction rules 1228a may comprise various data storage/transfer requirements of the one or more jurisdictions. The jurisdiction rules 1228a may include rules that are based on jurisdiction a change event (e.g., a change in jurisdiction from jurisdiction A to jurisdiction B causes data migration to jurisdiction B), based on data types (e.g., vehicle user identification data, vehicle location data, vehicle camera data are allowed to be migrated), based on jurisdictions (e.g., data migration to jurisdiction B is forbidden), or any combination thereof. For example, one jurisdiction rule may require GPS vehicle data to be migrated to jurisdiction B 1202b upon detection of the jurisdiction change trigger event to jurisdiction B 1202b. The jurisdiction rules 1228a, 1228b, and 1228c may be added, removed, or modified and may be synchronized between multiple jurisdictions.

Once the jurisdiction rules to apply to the vehicle data have been determined, the workflow engine 1230a creates a routing rule and/or a migration job for the data migration system 1240a. The data migration system 1240a receives a migration notice from the data jurisdiction management system 1230a that identifies the one or more portions of the vehicle data to be moved. The migration of vehicle data may involve vehicle migration system 1240a, 1240b, and 1240c of respective jurisdictions 1202a, 1202b, and 1202c. In some embodiments, the data migration system 1240a may transfer the vehicle data in batches. The jurisdiction rules engine 1226a may, based on a set of jurisdiction rules 1228a, determine whether one or more portions of the data of the vehicle 1250 should be deleted, moved, or retained. The data migration system 1240a, based on the received migration notice, moves the one or more portions of the vehicle data stored in jurisdiction A 1202a to jurisdiction B 1202b. The workflow engine 1230a, in some embodiments, communicates with other data jurisdiction systems where data pertaining to the associated VIN is stored. The workflow engine 1230a may reconcile applicable rules and the priorities associated to respective vehicle data to determine a migration strategy to be implemented in all of the affected jurisdictions.

In some embodiments, the jurisdiction rules engine 1228a may determine that a jurisdiction conflict exists between one or more rules of the set of jurisdiction rules 1228a that have been selected to be applied. The jurisdiction rules engine 1226a may initiate a jurisdiction conflict resolution workflow to resolve the conflict. The workflow engine 1230a may resolve the conflict between the jurisdiction rules 1228a using a predetermined prioritization scheme. In some embodiments, a manual resolution may be required in the conflict resolution workflow where the conflict is presented to a user via a user interface and a user decision is received. Based on the user decision, the workflow engine 1230a may resolve the conflict.

Figure 13:
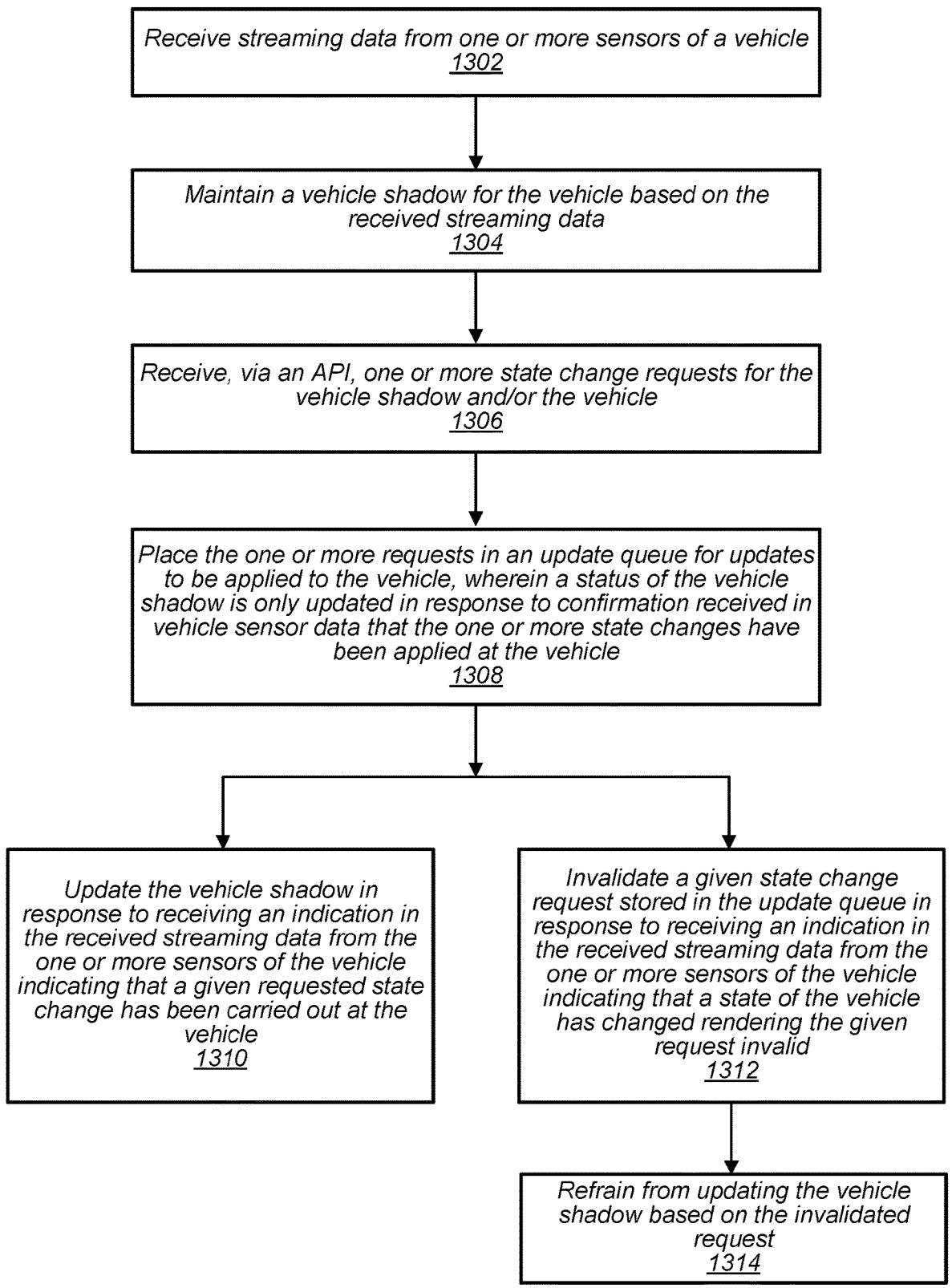
FIG. 13 illustrates a process of managing state change requests for a vehicle that are received by a vehicle shadow service, according to some embodiments.

FIG. 13 illustrates a process of managing state change requests for a vehicle that are received by a vehicle shadow service, according to some embodiments.

At block 1302, a vehicle shadow service receives streaming data from one or more sensors of a vehicle. At block 1304, the vehicle shadow service maintains an up-to-date vehicle shadow for the vehicle based on the received streaming data.

At block 1306, the vehicle shadow service receives, via an API of the vehicle shadow service, one or more state change requests to be applied for the vehicle shadow and/or the vehicle. At block 1308, the vehicle shadow service places the one or more requests in an update queue for updates to be applied to the vehicle, wherein a status of the vehicle shadow is only updated in response to confirmation received in vehicle sensor data that the one or more state changes have been applied at the vehicle. At block 1310, the vehicle shadow service updates the vehicle shadow in response to receiving an indication in the received streaming data from the one or more sensors of the vehicle indicating that a given requested state change has been carried out at the vehicle. Alternatively, at block 1312, the vehicle shadow service invalidates a given state change request stored in the update queue in response to receiving an indication in the received streaming data from the one or more sensors of the vehicle indicating that a state of the vehicle has changed rendering the given request invalid. Alternatively, the state change request may be invalidated based on a subsequently received state change request, due to expiration, or in response to a specific request to invalidate the state change request, for example received via the API. At block 1314, the vehicle shadow service refrains from updating the vehicle shadow based on the invalidated request (e.g., the vehicle shadow is updated based on what is reflected in the received sensor data in the data stream regardless of what was requested (and later invalidated)).

Figure 14:
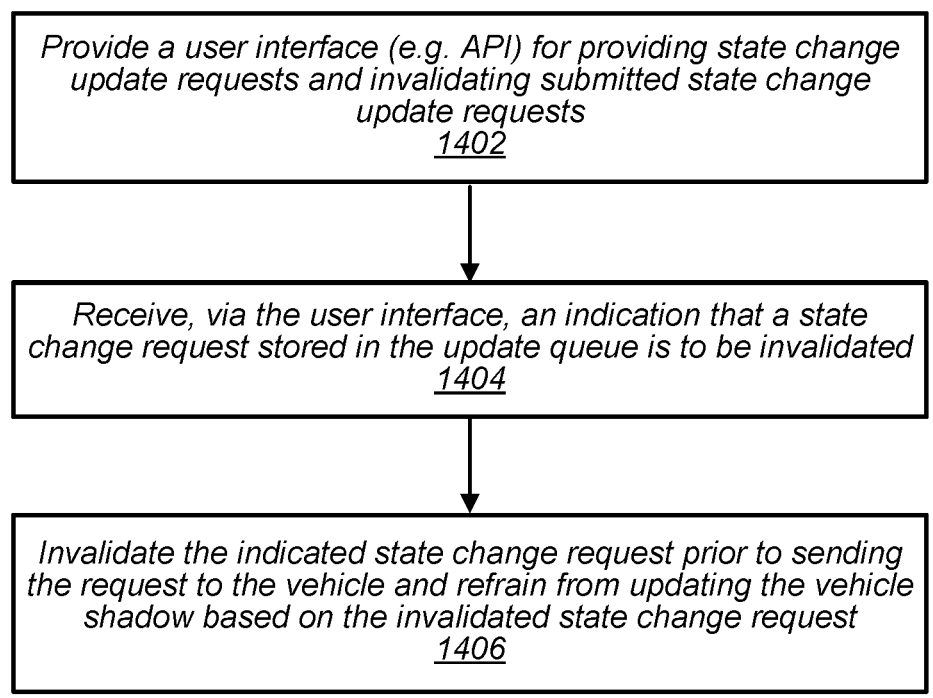
FIG. 14 illustrates a process of providing a user interface for managing pending requests stored in a queue of vehicle shadow management system, according to some embodiments.

FIG. 14 illustrates a process of providing a user interface for managing pending requests stored in a queue of vehicle shadow management system, according to some embodiments.

At block 1402, a vehicle shadow service provides a user interface, such as an API or other interface, for providing state change requests and for invalidating previously submitted state change requests. At block 1404, the vehicle shadow service receives, via the user interface, in indication that a state change request stored in the update queue is to be invalidated. For example, as further described in FIG. 15, a jurisdiction for the vehicle may have changed such that a previous vehicle shadow is no longer authoritative and all pending state change requests associated with the superseded vehicle shadow should be invalidated. At block 1406, the vehicle shadow service invalidates the state change requests stored in the update queue as indicated in the request to invalidate. The vehicle shadow service also refrains from sending the invalidated state change requests to the vehicle and also refrains from updating the vehicle shadow based on the invalidated state change requests.

Figure 15:
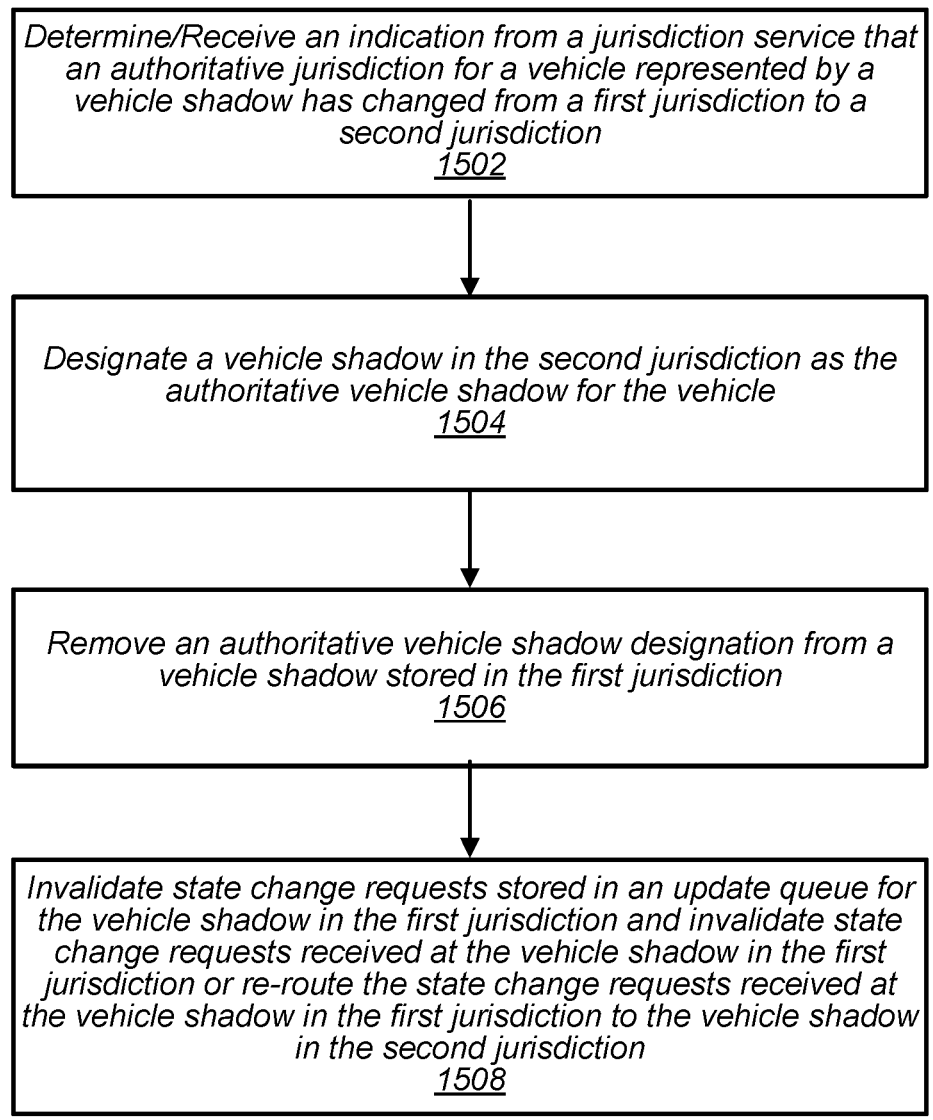
FIG. 15 illustrates a process for updating an authoritative jurisdiction for a vehicle shadow and invalidating state change requests at a superseded vehicle shadow, according to some embodiments.

FIG. 15 illustrates a process for updating an authoritative jurisdiction for a vehicle shadow and invalidating state change requests at a superseded vehicle shadow, according to some embodiments.

At block 1502, the vehicle shadow service receives an indication from a data jurisdiction service (and/or a data jurisdiction service as illustrates in FIG. 12 determines) that an authoritative jurisdiction for a vehicle represented by a vehicle shadow has changed from a first jurisdiction to a second jurisdiction. In response, at block 1504, the vehicle shadow service designates a vehicle shadow in the second jurisdiction as the authoritative vehicle shadow for the vehicle. Also, at block 1506, the vehicle shadow service removes an authoritative vehicle shadow designation from a vehicle shadow for the vehicle stored in the first jurisdiction. In some embodiments, various other rules may be applied to resolve which jurisdiction is authoritative as determined by the data jurisdiction service.

At block 1508, the vehicle shadow service invalidates state change requests still pending at the superseded vehicle shadow. For example, state change requests stored in an update queue for the vehicle shadow in the first jurisdiction may be invalidated. Also, state change requests subsequently received at the vehicle shadow in the first jurisdiction may be invalidated and/or re-routed to the vehicle shadow in the second jurisdiction. In some embodiments, a vehicle shadow service may maintain a centralized vehicle shadow management system for multiple jurisdictions, such that all state change requests are routed to the centralized vehicle shadow management sub-system. Alternatively separate vehicle shadow management sub-systems may be maintained in different jurisdictions and a data jurisdiction service may be used to determine an authoritative jurisdiction, as described above.

Figure 16:
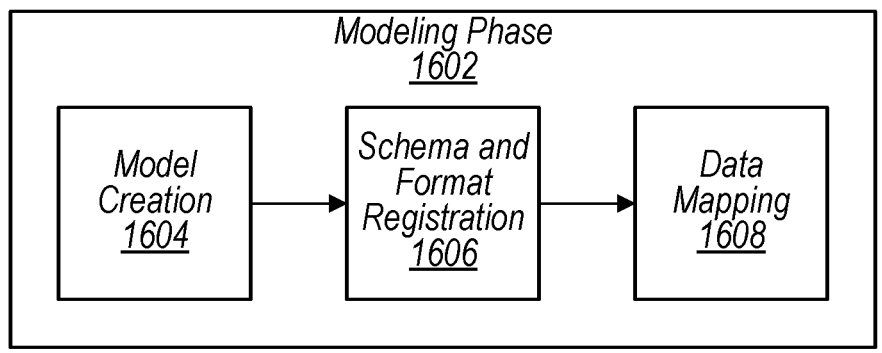
FIG. 16 illustrates a process of generating a model for a vehicle shadow, according to some embodiments.

FIG. 16 illustrates a process of generating a model for a vehicle shadow, according to some embodiments.

In some embodiments, a modelling phase carried out by a vehicle shadow model builder, such as vehicle shadow model builder 126 shown in FIG. 1 and vehicle shadow model builder 414 shown in FIG. 4, may include a model creation phase 1604, schema and format registration phase 1606 and a data mapping phase 1606.

For example, the modeling phase 1602 may be used for defining a vehicle shadow model, mapping data sources to schemas (for supported formats), and mapping of attributes from the schemas to the model. The vehicle shadow service may provide a user interface for modelling the vehicle shadow, defining the entities and their properties, the relationships between them, and the cardinality associated to the relationships. The data source to schema mapping may contain data source metadata that will allow the vehicle shadow service to identify the schema to use for validating and parsing incoming data. The schema to shadow mapping may define the source attribute for the identifier of the root entity (such as the vehicle VIN) in the vehicle shadow from the schema, the source of data attributes in the schema, optional transformation of attributes (which may include creation of new attributes that may be fixed in value or derived), and the destination path of attributes to the vehicle shadow structure. If there are vehicle shadow entities with a cardinality of greater than 1 in the destination path, identifier attributes would need to be defined in the mapping to differentiate between the instances. For example, a cardinality greater than one is when there are two or more destination paths to a given attribute, such as front left tire or left front tire, as an example.

Figure 17:
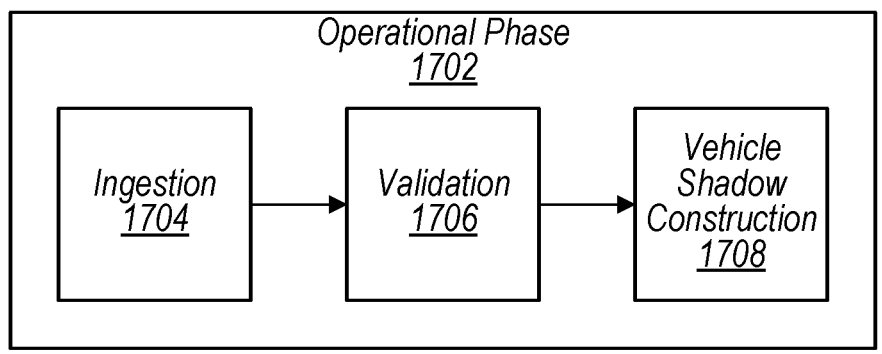
FIG. 17 illustrates a process of maintaining a vehicle shadow up-to-date, according to some embodiments.

FIG. 17 illustrates a process of maintaining a vehicle shadow up-to-date, according to some embodiments.

Operational phase 1702 includes ingestion of streaming data phase 1704, validation of the ingested streaming data phase 1706 and vehicle shadow construction phase 1706.

In the operational phase 1702 data processing is activated. The vehicle shadow service ingests data from various sources based on data source to schema mappings already defined. The vehicle shadow service also validates the data to assure compliance to the schema. On successful validation, the vehicle shadows are incrementally constructed based on the schema to shadow mappings that have been defined. The vehicle shadow service finds the appropriate entities to update the values for based on the mapping, and if the entity cannot be found, the vehicle shadow service will construct all the missing entities in the destination path of the mapping using the identifier and data attributes available.

Figure 18:
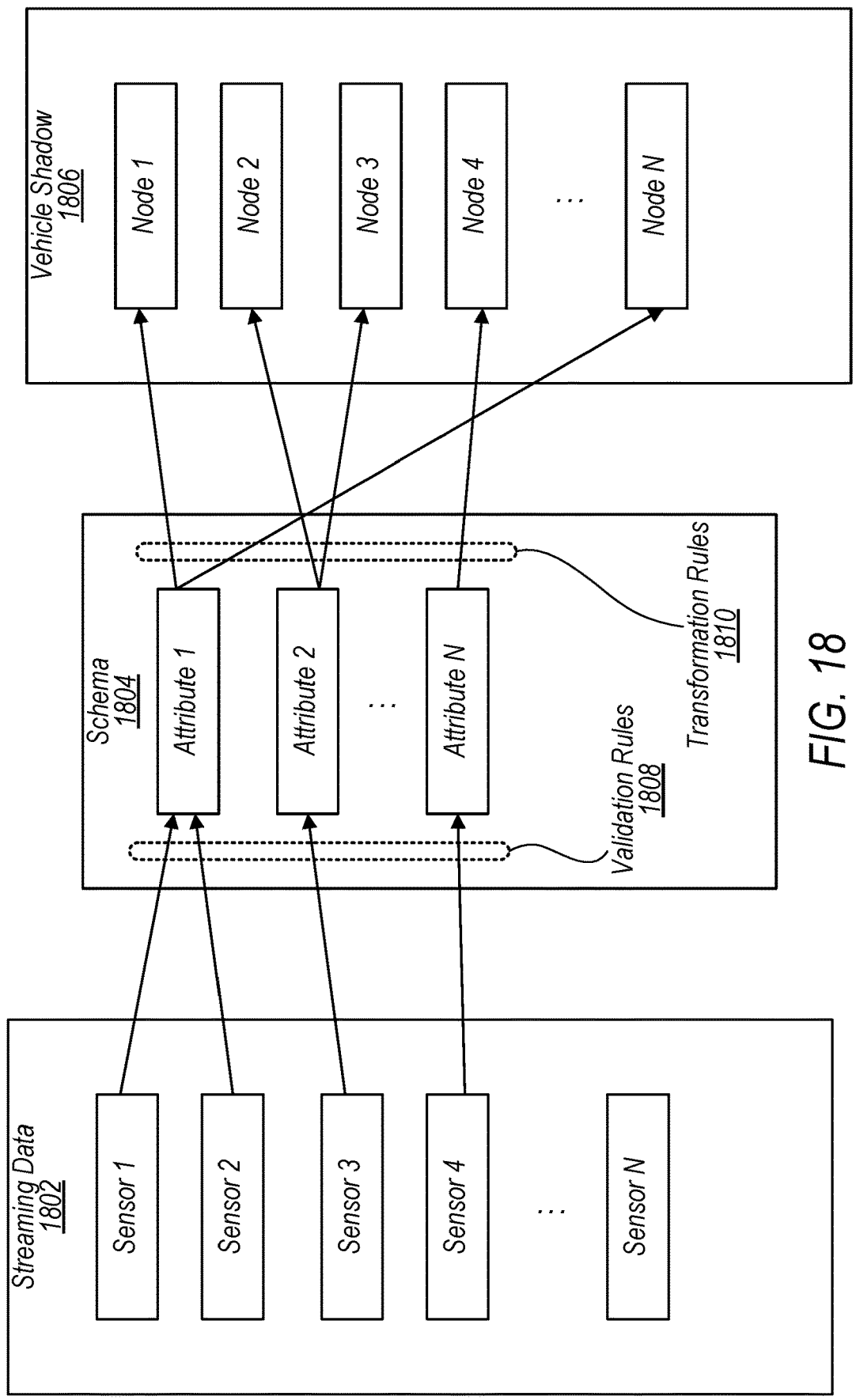
FIG. 18 illustrates an example mapping between elements of streaming data and attributes of a schema, along with a mapping between the attributes of the schema and nodes of a vehicle shadow, according to some embodiments.

FIG. 18 illustrates an example mapping between elements of streaming data and attributes of a schema, along with a mapping between the attributes of the schema and nodes of a vehicle shadow, according to some embodiments.

For example, streaming data 1802 comprising data sources from sensors 1 through N is mapped to schema 1804, wherein data corresponding to different ones of sensors 1 through N are mapped to attributes 1 through N of schema 1804. Also, validation rules 1808 are applied to the ingested data, ingested from streaming data 1802 to ensure compliance with schema 1804. The attributes 1 through N of schema 1804 are then mapped to nodes of the vehicle shadow, such as nodes 1 through N of vehicle shadow 1806. In some embodiments, more than one sensor may be mapped to an attribute. For example, sensors 1 and 2 are mapped to attribute 1. Also, in some embodiments, multiple attributes may be mapped to a same node of the vehicle shadow. For example, attributes 2 and N are both mapped to Node 3. Also, in some embodiments, a given attribute may be mapped to more than one node. For example, attribute 1 is mapped to both nodes 1 and N. Also, attribute 2 is mapped to nodes 2 and 3. In some embodiments transformation rules 1810 may be applied to attributes to transform the attribute values into values to be included in the nodes of the vehicle shadow.

Note that in some embodiments, the nodes of vehicle shadow 1806 may be leaf nodes of a tree-structure, such as shown in FIG. 2 for tree-based vehicle shadow 200. Also, in some embodiments, the nodes of the vehicle shadow 1806 may be nodes of a graph-structure, such as graph-based vehicle shadow 300 shown in FIG. 3.

Figure 19:
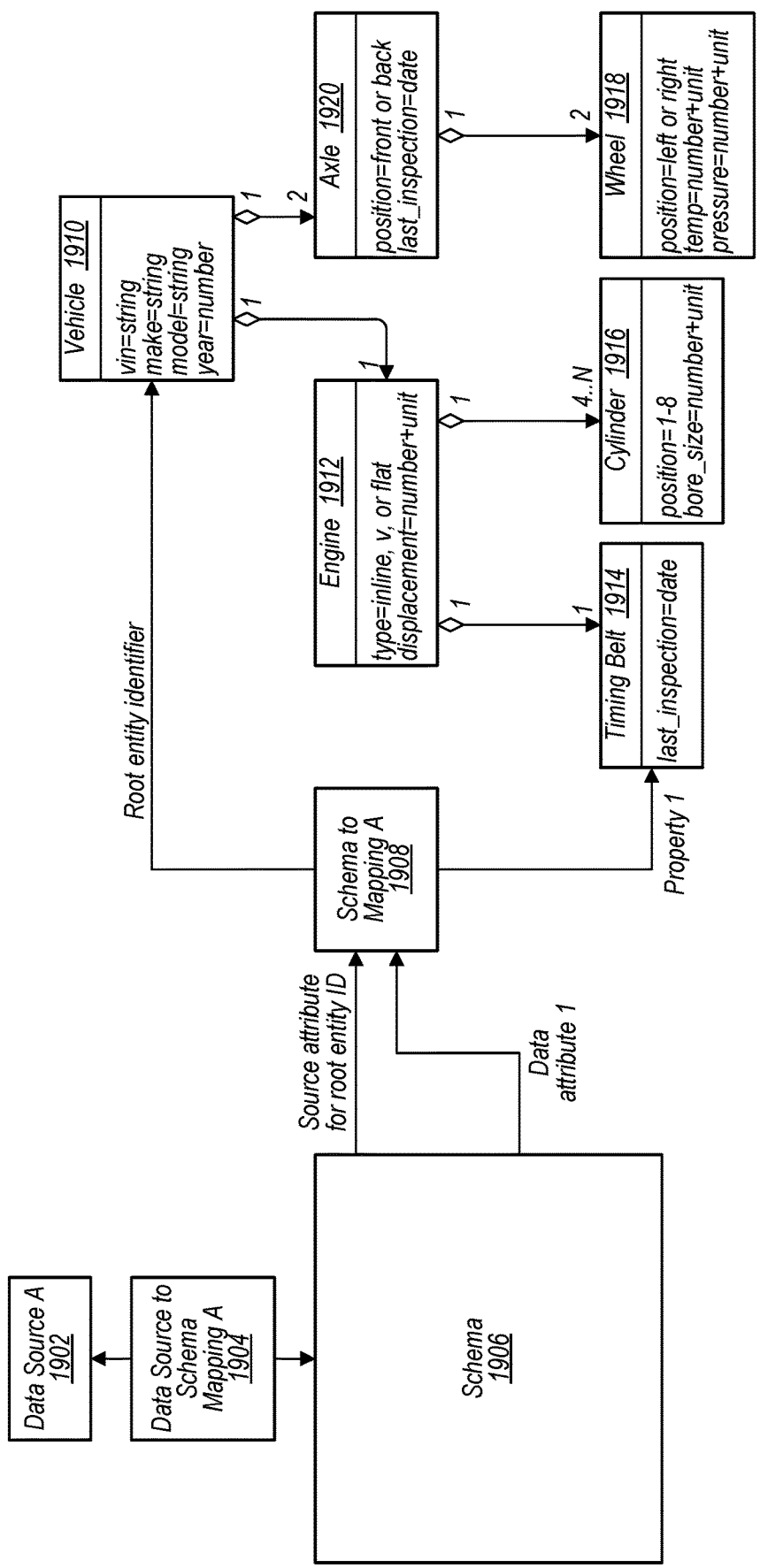
FIG. 19 illustrates an example mapping wherein there are no entries in the destination path with a cardinality greater than 1, according to some embodiments.

FIG. 19 illustrates an example mapping wherein there are no entries in the destination path with a cardinality greater than 1, according to some embodiments.

In the example of "Schema to Shadow Mapping A" 1908, a "VIN" attribute of schema 1906 may be used as the identifier of the root entity, which is the "yin" property in the "Vehicle 1910" of the vehicle shadow. The "timing_belt_last_inspection 1914" attribute is stored as epoch milliseconds, so it needs to be transformed to a date. The transformed attribute has a destination path of "Vehicle 1910" entity, to "Engine 1912" entity, to "Timing Belt 1914" entity, to "last_inspection" property. There are no entities in the destination path with a cardinality greater than 1, so the mapping is complete.

Figure 20:
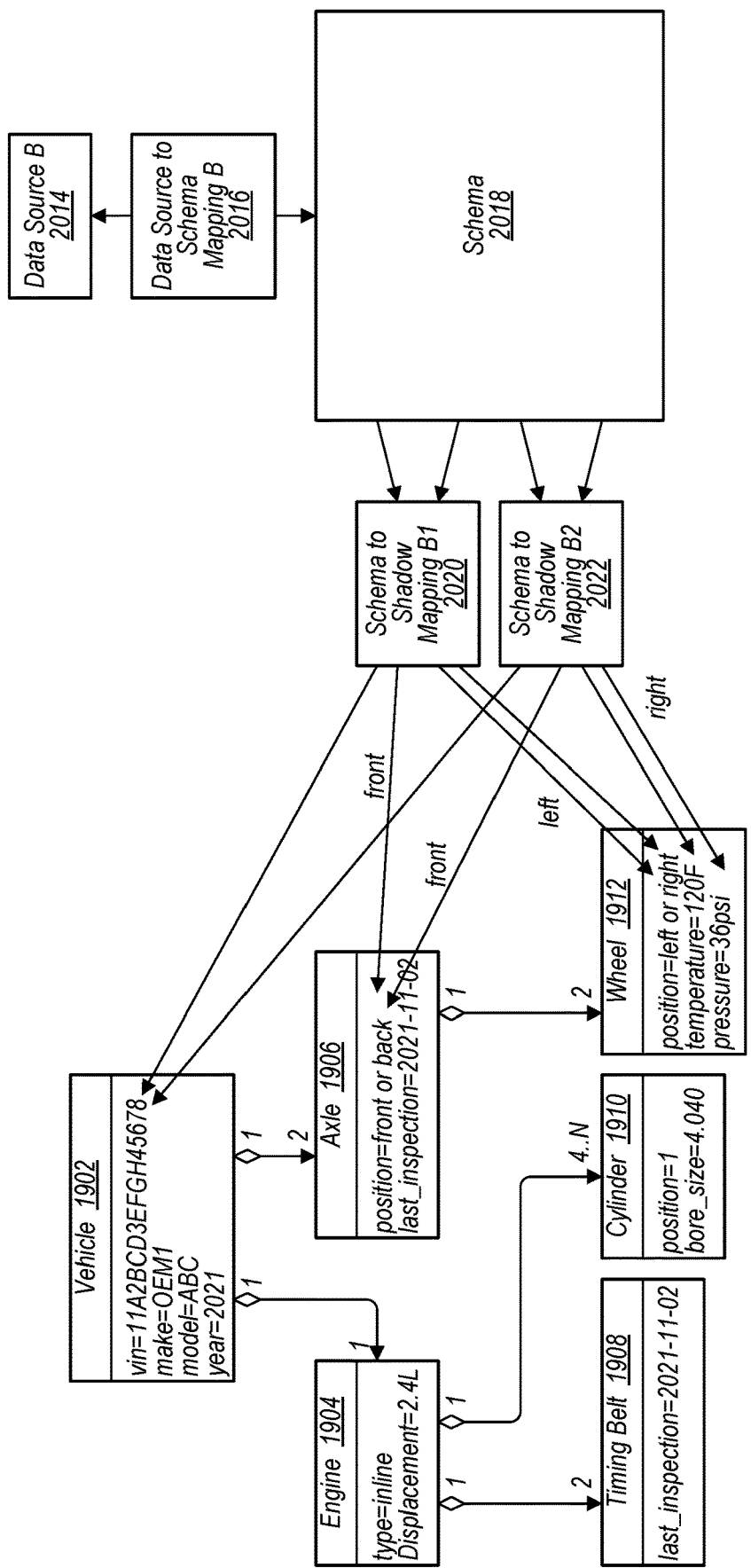
FIG. 20 illustrates an alternative example mapping wherein at least some of the entries in the destination path have a cardinality greater than 1, according to some embodiments.

FIG. 20 illustrates an alternative example mapping wherein at least some of the entries in the destination path have a cardinality greater than 1, according to some embodiments.

In the example of "Schema to Shadow Mapping B1 2020", the "VIN" attribute is used as the identifier of the root entity, which is the "yin" property in the "Vehicle 1902" element of the vehicle shadow. A first item in a "tire_pressure" array attribute of schema 2018 may be selected. The data attribute has a destination path of "Vehicle 1902" entity, to "Axle 1906" entity, to "Wheel 1912" entity, to "pressure" property. The "Axle 1906" and "Wheel 1912" entities in the destination path have a cardinality greater than 1, so a new attribute (in addition to VIN) with a fixed value of "front" is needed to uniquely identify the "Axle 1906" entity through the "position" property, a new attribute with a fixed value of "left" is needed to uniquely identify the "Wheel 1912" entity through the "position" property, and the mapping is complete.

In the example of "Schema to Shadow Mapping B2 2022", the "VIN" is used as the identifier of the root entity, which is the "yin" property in the "Vehicle 1902" element of the vehicle shadow. A second item in the "tire_pressure" array attribute of schema 2018 is selected. The data attribute has a destination path of "Vehicle 1902" entity, to "Axle 1906" entity, to "Wheel 1912" entity, to "pressure" property. The "Axle 1906" and "Wheel 1912" entities in the destination path have a cardinality greater than 1, so we create a new attribute (in addition to VIN) with a fixed value of "front" is needed to uniquely identify the "Axle 1906" entity through the "position" property, a new attribute with a fixed value of "right" is needed to uniquely identify the "Wheel" entity through the "position" property, and the mapping is complete.

Note that the mappings shown in FIGS. 19 and 20 for a graph-based instance type may be used with any of the other graph-based vehicle shadows as described herein. As already mentioned, in some embodiments, a tree-structure may be used as alternative, wherein each leave has a cardinality of 1.

Figure 21:
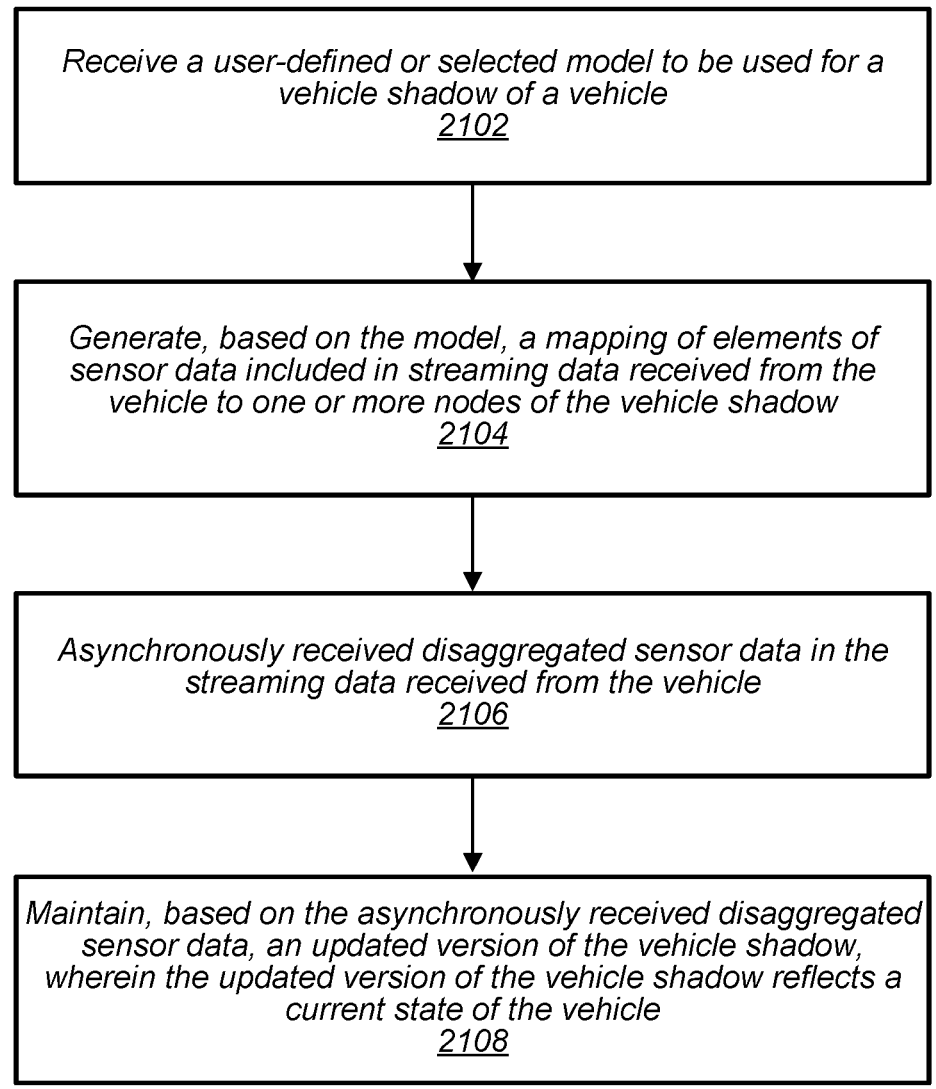
FIG. 21 illustrates a process of generating a mapping for a vehicle shadow and updating the vehicle shadow using asynchronously received disaggregated sensor data of a data stream, according to some embodiments.

FIG. 21 illustrates a process of generating a mapping for a vehicle shadow and updating the vehicle shadow using asynchronously received disaggregated sensor data of a data stream, according to some embodiments.

At block 2102, a vehicle shadow service receives a user-defined or selected model to be used for a vehicle shadow of the vehicle. At block 2104, the vehicle shadow service generates, based on the model, a mapping of elements of sensor data included in streaming data received from the vehicle to one or more nodes of the vehicle shadow. At block 2106, the vehicle shadow service asynchronously revives disaggregated sensor data, which is included in ingested streaming data received from the vehicle. At block 2108, the vehicle shadow service maintains, based on the asynchronously received disaggregated sensor data, an updated version of the vehicle shadow, wherein the updated version of the vehicle shadow reflects a current state of the vehicle.

Figure 22:
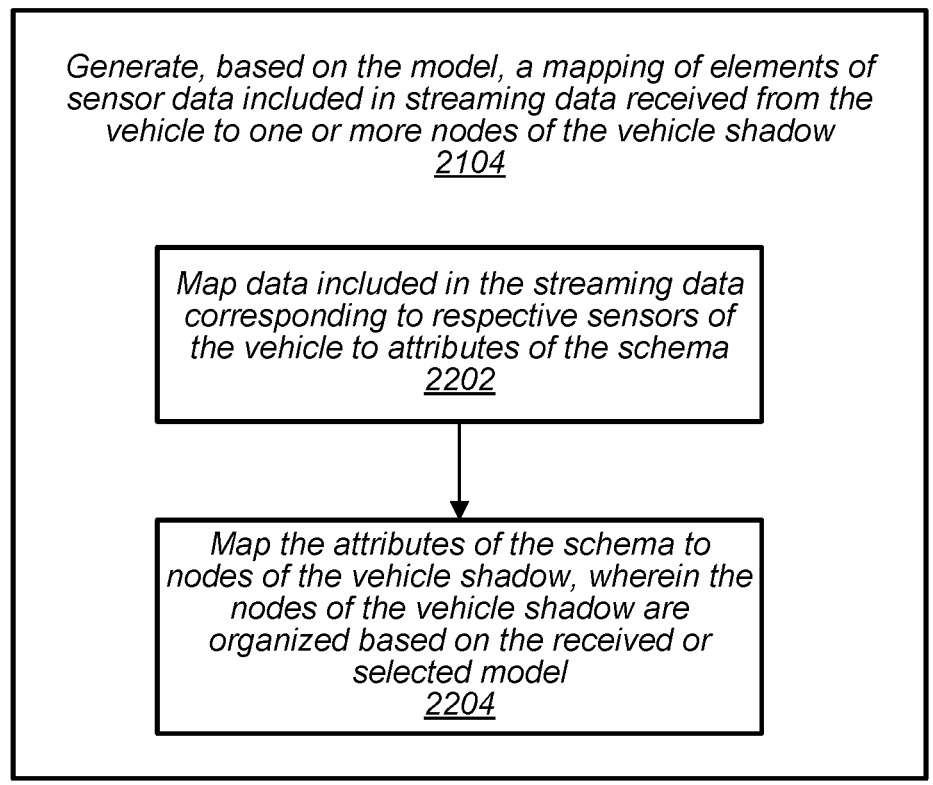
FIG. 22 illustrates additional details regarding how the mapping for the vehicle shadow is generated, according to some embodiments.

FIG. 22 illustrates additional details regarding how the mapping for the vehicle shadow is generated, according to some embodiments.

In some embodiments, in order to generate the mapping, at block 2202, the vehicle shadow service maps data included in the streaming data corresponding to respective sensors of the vehicle to attributes of the schema. Also, at block 2204, the vehicle shadow service maps the attributes of the schema to nodes of the vehicle shadow, wherein the nodes of the vehicle shadow are organized based on the received or selected model.

Example Computer System

Figure 23:
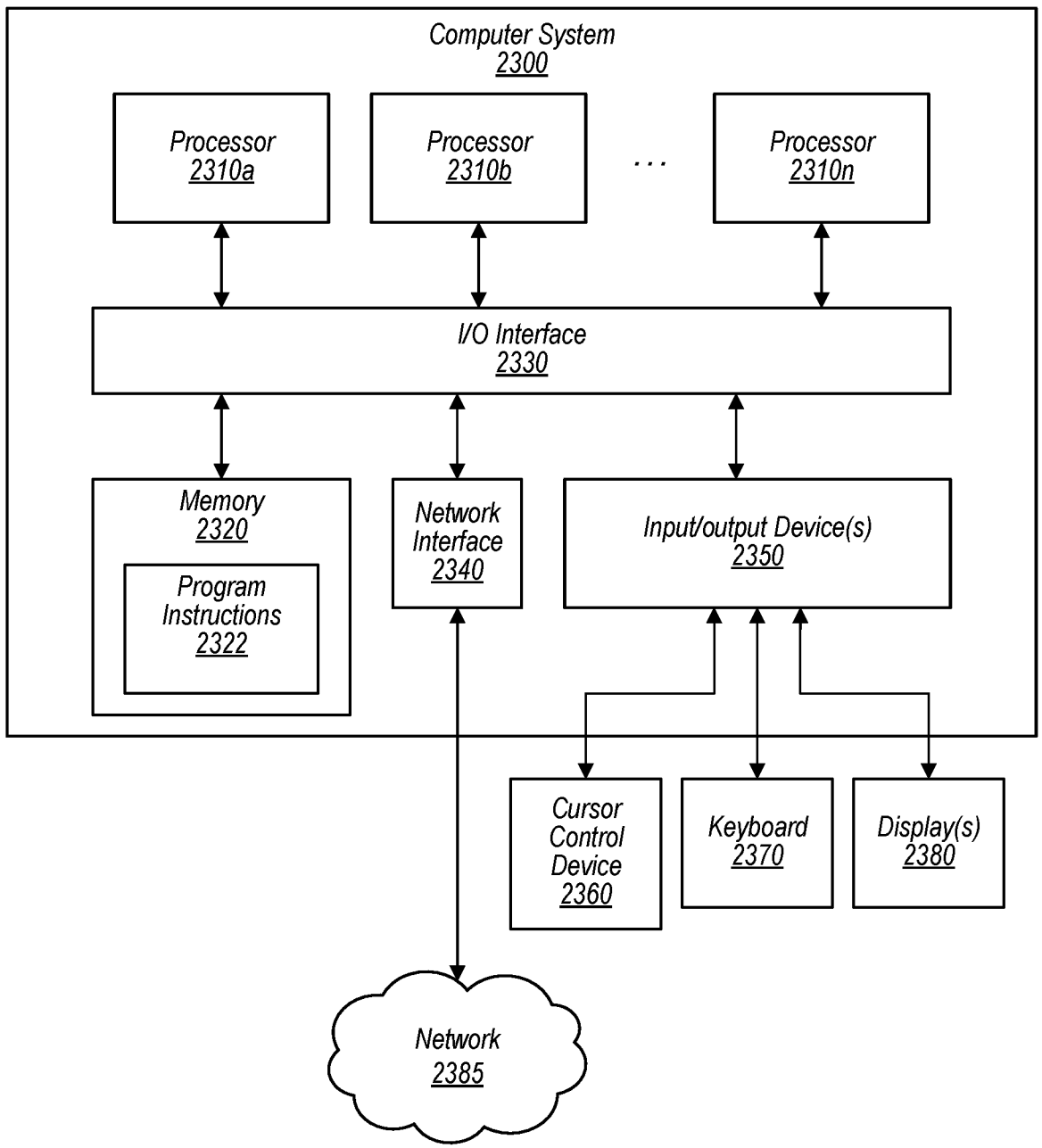
FIG. 23 illustrates a block diagram illustrating an example computer system that implements some or all of the techniques described herein, according to some embodiments.

FIG. 23 illustrates exemplary computer system 2300 usable to implement the vehicle shadow service and various components thereof as described above with reference to FIGS. 1-22. In different embodiments, computer system 2300 may be any of various types of devices, including, but not limited to, a personal computer system, desktop computer, laptop, notebook, tablet, slate, pad, or netbook computer, handheld computer, workstation, network computer, a mobile device, a consumer device, application server, storage device, a peripheral device such as a switch, modem, router, or in general any type of computing or electronic device.

Various embodiments of program instructions for generating and updating a vehicle shadow and/or state of a corresponding vehicle, and migrating data of the vehicle to one or more other jurisdictions, as described herein, may be executed in one or more computer systems 2300, which may interact with various other devices. Note that any component, action, or functionality described above with respect to FIGS. 1-22 may be implemented on one or more computers configured as computer system 2300 of FIG. 23, according to various embodiments. In the illustrated embodiment, computer system 2300 includes one or more processors 2310 coupled to a system memory 2320 via an input/output (I/O) interface 2330. Computer system 2300 further includes a network interface 2340 coupled to I/O interface 2330, and one or more input/output devices 2350, such as cursor control device 2360, keyboard 2370, and display(s) 2380. In some cases, it is contemplated that embodiments may be implemented using a single instance of computer system 2300, while in other embodiments multiple such computer systems, or multiple nodes making up computer system 2300, may be configured to host different portions or instances program instructions as described above for various embodiments. For example, in one embodiment some elements of the program instructions may be implemented via one or more nodes of computer system 2300 that are distinct from those nodes implementing other elements.

In some embodiments, computer system 2300 may be implemented as a system on a chip (SoC). For example, in some embodiments, processors 2310, memory 2320, I/O interface 2330 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 2320 may be configured to store compression or decompression program instructions 2322 and/or sensor data accessible by processor 2310. In various embodiments, system memory 2320 may be implemented using any suitable memory technology, such as static random-access memory (SRAM), synchronous dynamic RAM (SDRAM), nonvolatile/Flash-type memory, or any other type of memory. In the illustrated embodiment, program instructions 2322 may be configured to implement any of the functionality described above. In some embodiments, program instructions and/or data may be received, sent or stored upon different types of computer-accessible media or on similar media separate from system memory 2320 or computer system 2300.

In one embodiment, I/O interface 2330 may be configured to coordinate I/O traffic between processor 2310, system memory 2320, and any peripheral devices in the device, including network interface 2340 or other peripheral interfaces, such as input/output devices 2350. In some embodiments, I/O interface 2330 may perform any necessary protocol, timing or other data transformations to convert data signals from one component (e.g., system memory 2320) into a format suitable for use by another component (e.g., processor 2310). In some embodiments, I/O interface 2330 may include support for devices attached through various types of peripheral buses, such as a variant of the Peripheral Component Interconnect (PCI) bus standard or the Universal Serial Bus (USB) standard, for example. In some embodiments, the function of I/O interface 2330 may be split into two or more separate components, such as a north bridge and a south bridge, for example. Also, in some embodiments some or all of the functionality of I/O interface 2330, such as an interface to system memory 2320, may be incorporated directly into processor 2310.

Network interface 2340 may be configured to allow data to be exchanged between computer system 2300 and other devices attached to a network 2385 (e.g., carrier or agent devices) or between nodes of computer system 2300. Network 2385 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 2350 may, in some embodiments, include one or more display terminals, keyboards, keypads, touchpads, scanning devices, voice or optical recognition devices, or any other devices suitable for entering or accessing data by one or more computer systems 2300. Multiple input/output devices 2350 may be present in computer system 2300 or may be distributed on various nodes of computer system 2300. In some embodiments, similar input/output devices may be separate from computer system 2300 and may interact with one or more nodes of computer system 2300 through a wired or wireless connection, such as over network interface 2340.

As shown in FIG. 23, memory 2320 may include program instructions 2322, which may be processor-executable to implement any element or action described above. In one embodiment, the program instructions may implement the methods described above. In other embodiments, different elements and data may be included.

Computer system 2300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2300 may be transmitted to computer system 2300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more computing devices configured to implement a vehicle shadow service, configured to:
receive streaming data from one or more sensors of a vehicle; and
maintain a vehicle shadow for the vehicle, wherein data values of the vehicle shadow correspond to data included in the streaming data received from the vehicle; and
one or more computing devices configured to implement a vehicle shadow management system for the vehicle shadow service, the vehicle shadow management system configured to:
receive, via an application programmatic interface (API), one or more state change requests to change a state of the vehicle from a first state to an updated state and to change the vehicle shadow to a corresponding updated state;
store the one or more received state change requests in an update queue;
provide a next valid state change request from the update queue to the vehicle to carry out a requested state change indicated in the next valid state change request to change the vehicle state from the first state to the updated state; and
update, the vehicle shadow to a corresponding updated state as indicated in the next valid state change request, in response to receiving an indication in the received streaming data from the one or more sensors of the vehicle indicating that the requested state change of the next valid state change request has been carried out at the vehicle to change the state of the vehicle from the first state to the updated state.

2. The system of claim 1, wherein the vehicle shadow management system is further configured to:
invalidate a given state change request stored in the update queue prior to providing the given state change request to the vehicle.

3. The system of claim 2, wherein the given state change request is invalidated in response to receiving an indication in the streaming data that one or more conditions of the vehicle have changed.

4. The system of claim 2, wherein the given state change request is invalidated in response to receiving a subsequent state change request that renders the given state change request invalid.

5. The system of claim 1, wherein the one or more computing devices configured to implement the vehicle shadow management system are further configured to:
provide, via a user interface, a listing of state change requests included in the update queue;
receive, via the user interface, an indication that one or more of the state changes requests included in the update queue is to be invalidated; and
invalidate the one or more state change requests in the update queue prior to sending the one or more state change requests to the vehicle.

6. A method, comprising:
receiving, via an application programmatic interface (API), one or more state change requests to change a state of a vehicle from a first state to an updated state and to change a vehicle shadow for the vehicle to a corresponding updated state;
storing the one or more received state change requests in an update queue;
providing one or more next valid state change requests from the update queue to the vehicle to carry out a requested state change indicated in the one or more next valid state change requests to change the vehicle state from the first state to the updated state; and
updating, the vehicle shadow for the vehicle to a corresponding updated state as indicated in the one or more next valid state change requests, in response to receiving an indication in received streaming data from one or more sensors of the vehicle indicating that the requested state change of the one or more next valid state change requests has been carried out at the vehicle to change the state of the vehicle from the first state to the updated state.

7. The method of claim 6, further comprising:
invalidating a given state change request stored in the update queue prior to providing the given state change request to the vehicle.

8. The method of claim 7, further comprising:
receiving the streaming data from the one or more sensors of the vehicle, wherein the streaming data comprises an indication that one or more conditions of the vehicle have changed,
wherein the given state change request is invalidated in response to the indication in the streaming data that the one or more conditions of the vehicle have changed.

9. The method of claim 7, further comprising:
receiving a subsequent state change request that renders the given state change request invalid,
wherein the given state change request is invalidated in response to processing the subsequent state change request that renders the given state change request invalid.

10. The method of claim 7, wherein the given state change request is invalidated in response to the given state change request expiring, wherein the given state change request expires after a threshold amount of time has passed since the given state change request was created, received, or stored.

11. The method of claim 6, wherein a plurality of vehicle shadows are stored for the vehicle in a plurality of jurisdictions, and wherein one of the plurality of vehicle shadows stored in an authoritative jurisdiction serves as an authoritative vehicle shadow for the vehicle.

12. The method of claim 11, wherein state change requests for the vehicle received at vehicle shadows for the vehicle in non-authoritative jurisdictions are rendered invalid.

13. The method of claim 6, further comprising:
determining a change in authoritative jurisdiction for the vehicle from a first jurisdiction to a second jurisdiction;
designating a vehicle shadow for the vehicle in the second jurisdiction as the authoritative vehicle shadow; and
removing a designation as authoritative vehicle shadow from the vehicle shadow for the vehicle in the first jurisdiction.

14. The method of claim 13, further comprising:
subsequent to determining the change in authoritative jurisdiction, invalidating state change requests stored at, or received at, the vehicle shadow in the first jurisdiction.

15. The method of claim 6, further comprising:
receiving an indication in the streaming data from state change request message sensor of the vehicle acknowledging the one or more next valid state change requests provided to the vehicle have been received by the vehicle.

16. The method of claim 6, wherein the streaming data comprises disaggregated data streams from a plurality of sensors of the vehicle, and wherein the disaggregated data streams are received asynchronously.

17. One or more non-transitory, computer-readable, storage media, storing program instructions that, when executed on or across one or more processors, cause the one or more processors to:

receive, via an application programmatic interface (API), one or more state change requests to change a state of a vehicle from a first state to an updated state and to change a vehicle shadow for the vehicle to a corresponding updated state;

store the one or more received state change requests in an update queue;

provide one or more next valid state change requests from the update queue to the vehicle to carry out a requested state change indicated in the one or more next valid state change requests to change the vehicle state from the first state to the updated state; and update, the vehicle shadow for the vehicle to a corresponding updated state as indicated in the one or more next valid state change requests, in response to receiving an indication in received streaming data from one or more sensors of the vehicle indicating that the requested state change of the one or more next valid state change requests has been carried out at the vehicle to change the state of the vehicle from the first state to the updated state.

18. The one or more non-transitory, computer-readable storage media of claim 17, wherein the program instructions, when executed on or across the one or more processors, further cause the one or more processors to:

invalidate a given state change request stored in the update queue prior to providing the given state change request to the vehicle.

19. The one or more non-transitory, computer-readable storage media of claim 18, wherein the given state change request is invalidated in response to an indication in the received streaming data that the one or more conditions of the vehicle have changed.

20. The one or more non-transitory, computer-readable storage media of claim 18, wherein the given state change request is invalidated in response to processing a subsequent state change request that renders the given state change request invalid.

* * * * *